US008140515B2

(12) United States Patent
Pradhan et al.

(10) Patent No.: US 8,140,515 B2
(45) Date of Patent: Mar. 20, 2012

(54) PERSONALIZATION ENGINE FOR BUILDING A USER PROFILE

(75) Inventors: Tushar Pradhan, San Francisco, CA (US); Thomas Osborne, San Francisco, CA (US); John Potter, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 30 days.

(21) Appl. No.: 12/607,584

(22) Filed: Oct. 28, 2009

(65) Prior Publication Data

US 2011/0066615 A1 Mar. 17, 2011

Related U.S. Application Data

(63) Continuation of application No. 12/362,840, filed on Jan. 30, 2009.

(60) Provisional application No. 61/076,229, filed on Jun. 27, 2008.

(51) Int. Cl.
G06G 7/00 (2006.01)
(52) U.S. Cl. ........ 707/711; 707/736; 707/737; 707/738; 707/739; 707/748
(58) Field of Classification Search .................. None
See application file for complete search history.

(56) References Cited

U.S. PATENT DOCUMENTS

| | | | |
|---|---|---|---|
| 6,480,885 B1 | 11/2002 | Olivier | |
| 6,839,680 B1* | 1/2005 | Liu et al. | 705/7.33 |
| 6,934,687 B1 | 8/2005 | Papierniak et al. | |
| 7,120,590 B1 | 10/2006 | Eisen et al. | |
| 2003/0088545 A1 | 5/2003 | Subramaniam et al. | |
| 2003/0191627 A1 | 10/2003 | Au | |
| 2004/0059708 A1* | 3/2004 | Dean et al. | 707/1 |
| 2004/0068697 A1* | 4/2004 | Harik et al. | 715/513 |
| 2005/0033742 A1* | 2/2005 | Kamvar et al. | 707/7 |
| 2005/0071328 A1 | 3/2005 | Lawrence | |
| 2005/0076015 A1 | 4/2005 | Dettinger et al. | |
| 2005/0125212 A1* | 6/2005 | Hunt et al. | 703/21 |
| 2005/0222901 A1 | 10/2005 | Agarwal et al. | |
| 2005/0222989 A1* | 10/2005 | Haveliwala et al. | 707/3 |

(Continued)

OTHER PUBLICATIONS

International Search Report and Written Opinion (Application No. PCT/US2009/62318) Dated Dec. 15, 2009.

(Continued)

Primary Examiner — Tim T Vo
Assistant Examiner — Anh Tai Tran
(74) Attorney, Agent, or Firm — Marc S. Kaufman; Reed Smith LLP

(57) ABSTRACT

Users of electronic documents are classified for profiling and targeting of additional relevant content. Behavioral data is gathered from user registration information and user activity, and user documents and actions are categorized. Registration information is combined with collaborative and editorial data to provide user profile information. Author-generated document classification information is analyzed and assigned a first taxonomic noun to characterize the document. User-generated tags characterizing a portion of the document are assigned a second taxonomic noun. Search terms that resulted in the user accessing the document are identified and assigned a third taxonomic noun. Attributes related to how the document was accessed are evaluated and assigned a fourth taxonomic noun. The document is processed using pattern rules to extract a fifth taxonomic noun. The taxonomic nouns are aggregated to determine a composite set of taxonomic nouns, and the user is categorized using the taxonomic nouns, and/or the author-generated classification.

60 Claims, 13 Drawing Sheets

U.S. PATENT DOCUMENTS

| | | |
|---|---|---|
| 2005/0240580 A1 | 10/2005 | Zamir et al. |
| 2006/0026114 A1 | 2/2006 | Gregoire et al. |
| 2007/0005566 A1 | 1/2007 | Bobick et al. |
| 2007/0127702 A1 | 6/2007 | Shaffer et al. |
| 2008/0010615 A1 | 1/2008 | Curtis et al. |
| 2008/0104026 A1 | 5/2008 | Koran |
| 2010/0145927 A1* | 6/2010 | Kasbekar et al. ............. 707/710 |

OTHER PUBLICATIONS

Uzuner et al. "Proceedings of the SIGIR 2006 Workshop on Directions in Computational Analysis of Stylistics in Text Retrieval", published Aug. 10, 2006. [Retrieved on Jul. 27, 2009]; http://www.albany.edu/-ou372553/sigir_workshop_2006_proceedings.pdf.

* cited by examiner

TERM: [____] 511  TYPE: [COMPANY NAME ▼] 507  FLAG: [INACTIVE ▼] 509

PART-OF-SPEECH TAGS: ☐ NOUN (N)  ☐ VERB (V)  ☐ ADJ (J)  ☐ ADV (R)  ☐ PRON (P)  ☐ PREP (I)  ☐ CONJ (C)  ☐ INT (U)

SYNONYMS: [____] 513

TERM: [HELP]   SEARCH   GOOGLE   M-W                                   CREATE

| | TERM | TERM TYPE | TERM FLAG | PS TAGS | SYNONYMS | OCCURS | DCOUNTS | IDF | | |
|---|---|---|---|---|---|---|---|---|---|---|
| EDIT REMOVE | BROWSER~HELPER~OBJECT | PRODUCT TYPE | ACTIVE | | | 36.00 | 22 | 9.62 | ABOUT... | TOPICS... |
| EDIT REMOVE | COMPUTER~HELP~DESK | PRODUCT TYPE | ACTIVE | | | 11.00 | 9 | 10.51 | ABOUT... | TOPICS... |
| EDIT REMOVE | CSHARP~HELP | COMPANY NAME | ACTIVE | | | 12.00 | 12 | 10.23 | ABOUT... | TOPICS... |
| EDIT REMOVE | HELP | | ACTIVE | NV | | 2,950.00 | 2813 | 4.77 | ABOUT... | TOPICS... |
| EDIT REMOVE | HELP~AMERICA~VOTE~ACT | SPECIAL TERM | ACTIVE | | | 27.00 | 15 | 10.00 | ABOUT... | TOPICS... |
| EDIT REMOVE | HELP~DESK | SPECIAL TERM | ACTIVE | | HELP DESK | 1,644.00 | 901 | 5.91 | ABOUT... | TOPICS... |
| EDIT REMOVE | HELP~DESK~INSTITUTE | COMPANY NAME | HIDDEN | | | 16.00 | 15 | 10.00 | ABOUT... | TOPICS... |
| EDIT REMOVE | ONLINE~HELP | SPECIAL TERM | ACTIVE | | | 57.00 | 43 | 8.95 | ABOUT... | TOPICS... |
| EDIT REMOVE | ROBOHELP | PRODUCT NAME | ACTIVE | | | 23.00 | 10 | 10.41 | ABOUT... | TOPICS... |
| | | | | | | | | | | |

EDIT TOPIC: OPTICAL NETWORKING

AVAILABLE TERMS

RELATED-(1)
FIBER (396, 1118)
CWDM (6, 17)  — 725
NATIONAL LAMBDARAIL (8, 24)
METROPOLITAN AREA NETWORK (42, 55)
VDSL (11, 61)
NETWORK CAPACITY (38, 44)
AMP NETCONNECT (5, 5)
COMMUNICATIONS INDUSTRY (32, 44)
BANDWIDTH (263, 472)
CISCO TRANSPORT MANAGER (2, 6)
NETWORKING EQUIPMENT (63, 86)
BACKBONE (97, 134)
TELECOMMUNICATIONS (449, 935)
CABLE (357, 1324)
METRO ETHERNET (7, 30)
ETHERNET (146, 449)
ARPANET (5, 13)
LASER (64, 211)
CARRIER (249, 580)
CIRCUIT-SWITCHING (7, 9)
FDDI (10, 25)
DIGITAL LOOP CARRIER (3, 11)

ADD >>
<< REMOVE

SELECTED TERMS

DWDM
FIBER-OPTIC NETWORK
FIBER-OPTICS
FTTH
INTELLIGENT OPTICAL NETWORK
OPTICAL FIBER
OPTICAL NETWORK
OPTICAL NETWORKING
OPTICAL TECHNOLOGY
SDH
SONET
SONET RING
SONET/SDH
WDM

— 727

◄ BACK

SAVE

FIG. 7B

SITE: [UPDATES.COM (BETA) ▼]   SHOW TERMS WITH #TITLES = 25+ 10+ 5+ 1+ 10-24 5-9 1-4   INCLUDE: ☐ COMPANY NAMES ☐ PRODUCT NAMES

107 ITEMS   SORT BY: ●#TITLES ○#RFIs ○#RFIs/#TITLES     SHOW GOOD TOPIC CANDIDATES

| TERM | TERM TYPE | IS IN DICTIONARY? | # TOPICS | | # TITLES | LATEST TITLE | #RFIs IN PREV WEEK | [AVGSCORE] | [MAXSCORE] |
|---|---|---|---|---|---|---|---|---|---|
| TELEPHONE | PRODUCT TYPE | Y | 0 | CREATE TOPIC | 392 | 6/9/2005 | 18 | 0.34 | 0.95 |
| MOBILE | PRODUCT TYPE | Y | 0 | CREATE TOPIC | 315 | 6/9/2005 | 10 | 0.35 | 0.95 |
| VIDEO | PRODUCT TYPE | Y | 0 | CREATE TOPIC | 233 | 6/9/2005 | 34 | 0.37 | 0.91 |
| SOFTWARE | PRODUCT TYPE | Y | 0 | CREATE TOPIC | 215 | 6/3/2005 | 7 | 0.28 | 0.93 |
| CAMERA | PRODUCT TYPE | Y | 0 | CREATE TOPIC | 132 | 6/6/2005 | 17 | 0.43 | 0.92 |
| WEB | SPECIAL TERM | Y | 0 | CREATE TOPIC | 131 | 6/9/2005 | 8 | 0.27 | 0.73 |
| COMPUTER | PRODUCT TYPE | Y | 0 | CREATE TOPIC | 81 | 6/9/2005 | 4 | 0.33 | 0.85 |
| PHOTOGRAPH | PRODUCT TYPE | Y | 0 | CREATE TOPIC | 81 | 6/7/2005 | 3 | 0.42 | 0.99 |
| RADIO | PRODUCT TYPE | Y | 0 | CREATE TOPIC | 77 | 6/9/2005 | 4 | 0.45 | 0.89 |
| XBOX 360 | PRODUCT NAME | N | 0 | CREATE TOPIC | 63 | 5/25/2005 | 7 | 0.37 | 0.59 |
| TIGER | SPECIAL TERM | N | 0 | CREATE TOPIC | 60 | 5/27/2005 | 0 | 0.52 | 0.91 |
| DUAL-CORE | SPECIAL TERM | Y | 0 | CREATE TOPIC | 26 | 6/2/2005 | 3 | 0.63 | 0.94 |
| STAR WARS | SPECIAL TERM | Y | 0 | CREATE TOPIC | 26 | 5/26/2005 | 1 | 0.56 | 086 |

FIG. 8

| | CLUSTER NAME | CLUSTER ROOT | CLUSTER SIZE | TOTAL SCORE | TOTAL MATCH TERMS | TOTAL SUM IDF |
|---|---|---|---|---|---|---|
| EDIT | BLU-RAY DISC;CD-R;CD-RW;CONSUMER ELECTRONICS;DIGITAL VIDEO;DIGITAL VIDEO RECORDER;DISC;DVD;DVD PLAYER;DVD+RW;DVD-AUDIO;DVD-R;DVD-R/RW;DVD-RAM;DVD-RECORDER;DVD-RECORDING;DVD-REWRITABLE;DVD-ROM;DVD-RW;DVD-VIDEO;HOME VIDEO;RECORDER; | DISC | 18 | 11.25 | 246 | 1,764.02 |
| EDIT | DSL;BROADBAND;BROADBAND COMPANY;BROADBAND INTERNET;BROADBAND ISP;BROADBAND MARKET;BROADBAND NET;CABLE;CABLE INTERNET;CABLE MODEM;CABLE NET;CABLE NETWORK;CABLE SYSTEM;CABLE TELEPHONY;CABLE TELEVISION;DIAL-UP MODEM;DOCSIS;DSL SERVICE;HIGH-SPEED INTERNET;HIGH-SPEED INTERNET ACCESS;HIGH-SPEED INTERNET ACCESS PROVIDER;HIGH-SPEED NETWORK;HIGH-SPEED SERVICE;INTERNET ACCESS;INTERNET SERVICE;TV COMPANY; | CABLE MODEM | 19 | 10.75 | 294 | 1,677.44 |
| EDIT | MICROSOFT ACCESS;MICROSOFT EXCEL;MICROSOFT EXCEL 2002;MICROSOFT EXCEL 97;MICROSOFT OFFICE;MICROSOFT OFFICE 2000;MICROSOFT OFFICE 95;MICROSOFT OFFICE 97;MICROSOFT OFFICE XP;MICROSOFT OUTLOOK 2002;MICROSOFT POWERPOINT;MICROSOFT WORD;MICROSOFT WORD 2000;MICROSOFT WORD 2002;MICROSOFT WORD 2003;MICROSOFT WORD 97;OFFICE APPLICATION;OFFICE UPDATE;SMART TAGS;VBA; | MICRO-SOFT EXCEL | 17 | 9.78 | 236 | 1,664.90 |
| EDIT | APPLE IPOD;APPLE ITUNES;DELL DIGITAL JUKEBOX;DIGITAL MEDIA;DIGITAL MUSIC;DIGITAL MUSIC PLAYER;INTERNET MUSIC;IPOD MINI;IPOD MUSIC PLAYER;JUKEBOX;MP3;MP3 PLAYER;MUSIC;MUSIC DOWNLOAD;MUSIC INDUSTRY;MUSIC PLAYER;ONLINE MUSIC;RECORDING INDUSTRY;SDMI;SUBSCRIPTION SERVICE;WINDOWS MEDIA FORMAT;WMA; | DIGITAL MUSIC | 17 | 10.49 | 272 | 1,648.58 |
| EDIT | 32-BIT;32 BIT ARCHITECTURE;32-BIT CPU;32-BIT SYSTEM;64-BIT;64-BIT ARCHITECTURE;64-BIT COMPUTING;64-BIT CPU;64-BIT SYSTEM;AMD ATHLON 64;AMD OPTERON;AMD64;EXPLICITLY PARALLEL INSTRUCTION COMPUTING;INTEL IA-32;INTEL IA-64;INTEL ITANIUM;INTEL x86;RISC; | 64-BIT | 16 | 10.04 | 248 | 1,601.08 |

FIG. 9

PERSONALIZATION ENGINE FOR BUILDING A USER PROFILE

CROSS REFERENCE TO RELATED DOCUMENTS

The present application is a continuation application of U.S. patent application Ser. No. 12/362,840 filed on Jan. 30, 2009. The present application also claims the benefit of priority of U.S. Provisional Patent Application Ser. No. 61/076,229 filed on Jun. 27, 2008. The contents of these related patent applications are incorporated below by reference.

FIELD OF THE INVENTION

The present invention relates to a system and method for profiling and targeting computer users to deliver digital content. More particularly, the present application relates to classifying unstructured electronic documents as a basis for delivering relevant digital content.

BACKGROUND OF THE INVENTION

Networks and interconnectivity of individuals, groups, and organizations have dramatically increased in recent years. The Internet connects the world by joining users that represent various entities, information, and resources. These connected users form enormous banks of resources, resulting in a world wide web of users. The users store and access data files, documents, and Web pages containing various content. The growth of the Internet has created many opportunities for users to uncover content and other resources related to their interests. Likewise, the growth has created opportunities for Web service providers to seek out users that may be interested in obtaining resources from the Web service provider. Users and providers communicate electronically, often exchanging resources and conducting electronic commerce. Web technology has made it possible to target information and resources to users with specific interests.

Targeting users with specific interests seeks to make the exchange of information and electronic commerce more efficient. Users receive materials related to their interests, while topics and materials in which they are not interested are sent to others. Targeting users seeks to reduce the burden on users who may ultimately consume products and services of the Web service providers. Targeting users helps alleviate the volumes and volumes of potential providers. To reduce the number of irrelevant product providers and to increase the quality of a consumer's interaction with relevant Web service providers, information regarding potential consumers may be filtered to deliver the most relevant materials to the user. Additionally, by properly targeting likely users, Web service providers may more efficiently focus their marketing and sales efforts.

Information filtering may be performed in a number of ways. For example, a customary consumer telephone directory of businesses, such as the Yellow Pages, filters product providers by geographic calling area. Further, Web Service Providers and Internet portals also classify information by categorizing Web pages by topics such as news, sports, entertainment, and the like. However, these broad subject areas are not always sufficient to locate information of interest to a consumer.

More sophisticated techniques for filtering products and services of interest to consumers may be employed by identifying information about the user. These methods may monitor and record a consumer's purchase behavior or other patterns of behavior. Information may be collected by means of surveys, questionnaires, opinion polls, and the like. These conventional techniques may be extrapolated to the networked world by means of inferential tracking programs, cookies, and other techniques designed to obtain consumer information with minimal consumer effort and minimal expenditure of provider resources.

Filtering methods serve to organize the array of information, goods, and services to assist the user by presenting materials that the user is more likely to be interested in, or by directing the user to materials that the user may find useful. Filtering attempts to sift through the vast stores of information while detecting and uncovering less conspicuous information that may be of interest to the user. Filtering methods attempt to locate items of meaningful information that would otherwise be obscured by the volume of irrelevant information vying for the attention of the user.

Information filtering may be directed to content-based filtering where keywords or key articles are examined and semantic and syntactic information are used to determine a user's interests. Additionally, expert systems may be utilized to "learn" a user's behavior patterns. For example, expert systems or intelligent software agents may note a user's actions in response to a variety of stimuli and then respond in the same manner when similar stimuli present in the future.

As expert systems grow, or as intelligent software agents expand to cover additional users or groups, the range and accuracy of the responses may be refined to increase the efficiency of the system. Collaboration among users or groups of like users results in increased accuracy with regard to predicting future user responses based upon past responses. Evaluating feedback of other similar users is effective in determining how a similar user will respond to similar stimuli. Users that agreed in the past will likely agree in the future. These collaborative filtering methods may use ratings for articles such as information, goods, services, and the like, to predict whether an article is relevant to a particular user.

Information may be transferred and stored on a consumer's computer by a Web server to monitor and record information related to a user's Web-related activities. The user's Web-related information may include information about product browsing, product selections, purchases made by the user at Web pages hosted by a Web server. The information stored by the inferential tracking programs is typically accessed and used by the Web server when the particular server or Web page is again accessed by the user computer. Cookies may be used by Web servers to identify users, to instruct the server to send a customized version of the requested Web page to the client computer, to submit account information for the user, and so forth. Explicit and implicit user information collection techniques may be used by Web-based providers of goods and services. In some instances, user information gathered by the servers is used to create personalized profiles for the users. The customized profiles are then used to summarize the user's activities at one or more Web pages associated with the server.

Current content advisory systems often focus on enhanced shopping carts to provide suggested additional products a user may purchase, while others have developed advisory systems to provide product recommendations based in part on a vendor payment to the Web-based provider to sort and move the vendor's product to the top of the list of recommended products or services.

Conventional content advisory systems focus on a point of sale event and only take into account a user's imminent product purchase and possibly prior purchases from the specific merchant. These prior systems do not cover all related digital content a user or users with similar activity patterns, may have acquired from a variety of sources.

Filtering methods based upon the content of the user's activities may be used to reach information, goods, and services for the user based upon correlations between the user's activities and the items. The filtering methods and customized profiles may then be used to recommend or suggest additional information, goods, and services in which the user may be interested.

These conventional systems may not utilize user profile information based on collected demographics, user ratings, editorial classifications, and behavioral data. Because they lack this additional data, typical advisory systems do not factor it into their recommendations.

The ability to accurately profile and target a user or a collection of similar users of a Web site is a difficult problem. Registration data, including demographic information, forms a component of this analysis, however, most users do not register or complete the registration form, and the data collected is not updated based on a user's current interests. Behavioral data gathered from a user's activity on a Web site can provide a more current indication of a user's interest, however, it is difficult to classify the documents or actions taken by a user unless the information is tagged or categorized based on its content and contextual meta-data.

SUMMARY OF THE INVENTION

The present invention includes a system, method, and computer program product for providing a current indication of a user's interest. A system, method, and computer program product in accordance with the present invention gathers behavioral data from a user's activity on Web sites and classifies the documents or actions taken by the user. The classification may include tagging, categorizing, and cataloging information based on its content. The present invention includes a system and a method of combining user profile information with collaborative content and editorial data to provide users with credible information regarding information, goods, and services.

In the context of the present invention and this application, the terms "document" and "content" and "resource" and "Web page" are used interchangeably to represent digital data files, such as text files, graphics files, and other types of computer files and digital information that may be stored on a computer readable medium.

The present invention includes a computer system and a computer-implemented method for building a user profile and targeting delivery of content to the user. One method in accordance with the present invention includes identifying a document that the user browsed and parsing the document to identify and analyze discrete information items. A method of the present invention then labels and stores the discrete information items as taxonomic nouns. Taxonomic nouns are classifiable words used to help categorize documents and other content.

Additionally, the method includes accumulating user behavior characteristics indicative of actions taken by the user and labeling and storing the accumulated user behavior characteristics. The user behavior characteristics are then combined with the taxonomic nouns to build a user profile. The method identifies customized and predictive targeted content based upon the user profile and delivers the targeted content to the user.

A method in accordance with the present invention may further label and store user registration information as demographic nouns and extend the user profile to include the taxonomic nouns, the user behavior characteristics, and the demographic nouns. The user profile may be built to represent the user's interests and to aggregate similar users into categories to allow reporting on the overall audience and targeting for content, advertisements, direct marketing, email marketing, and the like.

The present invention employs a computer-implemented method for classifying an electronic document. An author may classify a document or a portion of a document to provide details regarding the form, structure, content, and function of the document or the portion of the document. For example, author-generated classification information may be metadata assigned to the document. If an author provides such details, the method of the present invention analyzes the author-generated classification information regarding the document and assigns a set of first taxonomic nouns to characterize the document based upon the author-generated classification information. There may be no author-generated classification information, there may be a single author-generated classification, or there may be multiple author-generated classification information items. The system and method of the present invention analyzes the existing author-generated classification information if it is present and assigns a set of first taxonomic nouns to characterize the document.

Likewise, a user may generate a tag characterizing a document or a portion of a document to also provide details regarding the form, structure, content, and function of the document. If a user generates such a tag, the system and method of the present invention examines the user-generated tag characterizing a portion of the document and assigns a second taxonomic noun to characterize the document based upon the user-generated tag characterization. The user-generated tag characterizing the document or the portion of the document may include an item listed in a profile of the user or a technology implementation setting, such as the Internet Service Provider, a network configuration, a user computer system, and the like. There may be no user-generated tag information, there may be a single user-generated tag, or there may be multiple user-generated tags. The system and method of the present invention analyzes any existing tags and assigns a set of second taxonomic nouns to further characterize the document.

Also, if the user accessed the document by way of a search term or terms, the system and method of the present invention identifies the search term or terms that resulted in the user accessing the document and assigns a set of third taxonomic nouns to characterize the document based upon the search term(s) result. There may be no search terms that resulted in the user accessing the document, there may be a single search term, or there may be multiple search terms. The system and method of the present invention analyzes any search terms and assigns a set of third taxonomic nouns to further characterize the document.

Additionally, the system and method will evaluate attributes related to the manner in which a user accesses the document and assign a set of fourth taxonomic nouns to characterize the document based upon the attributes related to the manner in which the document was accessed. The attributes related to the manner in which the user accessed the document may include a network type used to access the document, an additional Web site from which the document was accessed, an electronic correspondence to which the document was associated, a time of day the document was accessed, a referrer who directed the user to the document, a document category used by a repository storing the document to describe the document, and similar attributes. Similarly, the attributes related to the manner in which the user accessed the document may include a click rate indicating a level of a user's relative interest in the document in relation to other documents available to the user.

Further, the system and method of the present invention processes the document to extract a set of fifth taxonomic nouns to characterize the document based upon the significant terms and relevant topics that are contained in the document and are extracted by automatically processing the content. Pattern rules may be included to specify the manner in which the significant terms and relevant topics are automatically processed and extracted. The processing may include electronically reading the text of the document, breaking the electronically-read text into a series of words and punctuation characters, and comparing sequences of consecutive words with known terms read from an electronic dictionary to determine if a match exists. If a match exists, the method may merge the matching consecutive words into a single multi-word term. If a match does not exist, the method may assign a single word term to the word. The system and method then processes the terms against the set of pattern rules to identify a part of speech assignment and a term type assignment and combines the terms and the part of speech assignment and the term type assignment into a structured term vector. Additionally, processing the document may include weighting the taxonomic nouns using a predetermined weighting scheme.

The system and method of the present invention aggregates the taxonomic nouns to determine term vectors that represent the document and categorizes the document based upon at least one of the term vectors, the taxonomic nouns, and the author-generated classification scheme. Determining the term vectors may include building a list and a count of taxonomic nouns and applying a dictionary of taxonomic nouns. Similarly, the list of taxonomic nouns may include a document and occurrence count. The dictionary of known taxonomic nouns may be updated from the list of taxonomic nouns to further identify taxonomic nouns in additional documents.

Once determined, the term vectors may be processed to identify a set of highly significant terms in the document. The term vectors may be identified based on the weights of the terms in the term vectors, or based upon other factors. Further, the term vectors may be processed to further derive a set of relevant higher topics by computing a similarity measure between the term vector for the document and the terms defined for each topic. Further, a self search may be executed to identify additional taxonomic nouns to create an additional topic set. Similarly, a co-occurrence analysis may be executed to identify and cluster related taxonomic nouns to create a taxonomic noun cluster. Any of the taxonomic noun clusters, topic sets, term vectors, and taxonomic nouns may then be edited to further refine the results and the categorization of the document. Additionally, in a type of feedback loop, the system and method of the present invention examines and analyzes the aggregate set of taxonomic nouns identified for all documents to identify candidate terms that may be added to the electronic dictionary of known terms for use in future processing cycles.

By building an accurate user profile based upon taxonomic nouns, user behavior characteristics, and demographic nouns, the system and method of the present invention may identify the most valuable and influential users and assign a value index to these users. The value index may represent the user's relative value to the Web provider compared to other users. For example, by characterizing users in this fashion, the number of users may be increased, existing users may be retained, and each user's value index may increase based upon additional user activity. Valuable and influential users often come from a base of "active users." An active user may be a user who is registered on a Web site and has performed one or more specific actions on a particular Web site or on one of a family of Web sites within a particular time period. The specific action might include sharing their interests, clicking on a newsletter, downloading a white paper, purchasing a product or a service, and the like. The particular time period may be set to any desired duration of time, such as within the last 30 days, for example. The value index of a user is based on the amount of information they have "disclosed" about themselves either explicitly or implicitly. Examples of explicit disclosure include users telling the system about their professional interests or searching for a particular term or joining a particular social network or purchasing a particular product. Examples of implicit disclosure include users subscribing to a newsletter about a specific job function or downloading a white paper on a particular topic.

As indicated above, in the context of the present invention, the items of information that users disclose to the system are called "nouns." In general, the more nouns a user has disclosed, the higher the user's value index. The system and method of the present invention supports a number of different types of nouns. For example, content-oriented (taxonomic) nouns such as companies, topics, products and keywords and demographic-based nouns such as first names, last names, company names, countries, zip codes, job functions, company size, industry, and the like, may all be supported by a system and method of the present invention.

Taxonomic nouns may be extracted by analysis of content items but may also be derived using other avenues, such as editorial classifications, search terms, and the like. The taxonomic nouns are "disclosed" by the user in a number of ways. For example, the user may disclose taxonomic nouns via actions such as downloads, posts, and similar actions on content items. Likewise, taxonomic nouns may be disclosed via actions such as searches, survey responses, poll responses, and the like that do not involve content items. Further, taxonomic nouns may be disclosed via profile values such as professional interests, current technology implementations, and similar profile values.

Demographics-based nouns may be specified by the user as part of their registration information, but may also be disclosed in the text of profile values such as in a biography or other personal or professional documents. Demographic nouns can also be generated based on a data derived from analysis of the user's connection information, including their IP address. For each user, the system will create a noun profile that is a unique list of nouns disclosed by the user. The value index of a user may be the size of the list of nouns, that is, the number of unique nouns in the list, or may be weighted based upon the type and number of nouns.

On a periodic basis, the system may generate a list of active users and a list of the most valuable users and a total value index. The total value index may be the sum of the value indexes for all active users or for the most valuable users, for example. The system will also provide a tool that displays a list of active users or a list of the most valuable users for the latest reporting period as well as a list of nouns for each user and other user information. The present invention extracts key concepts from documents and associates users with those key concepts to build a behavioral profile, merges demographic information from other sources to build an overall profile of a user, and aggregates similar users for targeting and to build an audience profile. The system and method of the present invention uses taxonomic nouns for this purpose.

The system and method of the present invention develops a deep understanding of users, their interests and passions, the topics they discuss and debate, the vendors they research and compare, the communities they form, the resources they look for to help with their daily job, and the like. The system and method of the present invention leverages this understanding to improve business processes relating to sales and marketing efforts, to improve user experiences with content and community relevancy, to provide more dynamic site content, and to provide better research/analysis/decision-making tools to Web site managers and product managers for site and content development.

These and other advantages, aspects, and features of the present invention will become more apparent from the following detailed description of embodiments and implementations of the present invention when viewed in conjunction with the accompanying drawings. The present invention is also capable of other embodiments and different embodiments, and details can be modified in various respects without departing from the spirit and scope of the present invention. Accordingly, the drawings and descriptions below are to be regarded as illustrative in nature, and not as restrictive.

BRIEF DESCRIPTION OF THE DRAWINGS

The accompanying drawings illustrate an embodiment of the invention and depict the above-mentioned and other features of this invention and the manner of attaining them. In the drawings:

FIG. 5 illustrates the fields that may be edited and viewed using a dictionary editor tool in accordance with the present invention.

FIGS. 7A and 7B illustrate a topic editor tool in accordance with the present invention.

FIG. 8 is a pictorial representation of a key term viewer tool in accordance with the present invention.

FIG. 9 is a pictorial representation of a cluster viewer tool in accordance with the present invention.

DETAILED DESCRIPTION OF THE INVENTION

Figure 1:
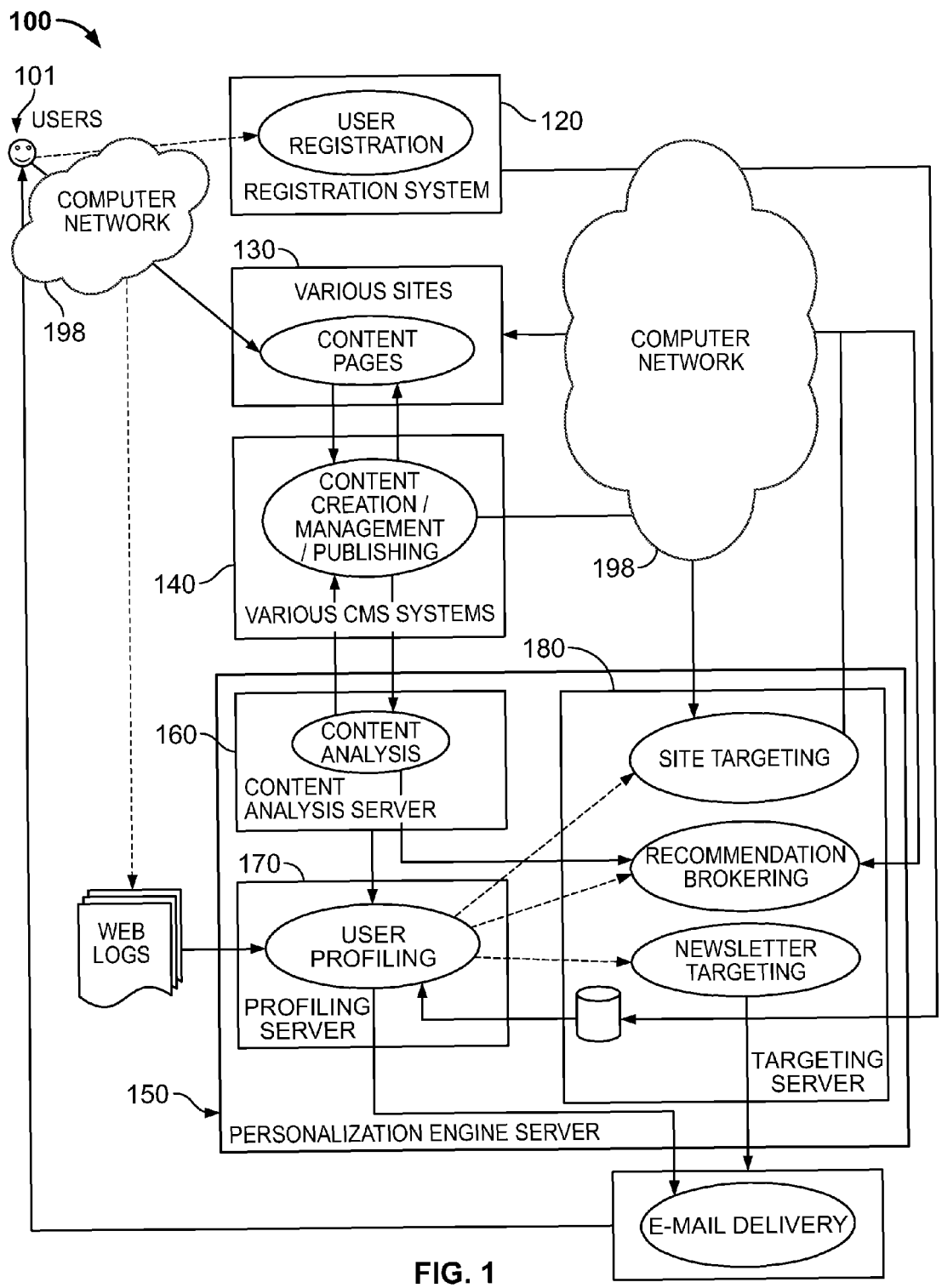
FIG. 1 illustrates a personalization engine computer system and network in accordance with the present invention.

The following detailed description of the invention refers to the accompanying drawings and to certain preferred embodiments, but the detailed description does not limit the invention. The scope of the invention is defined by the appended claims and equivalents as it will be apparent to those of skill in the art that various features, variations, and modifications can be included or excluded based upon the requirements of a particular use.

As illustrated in the discussion below, the present invention includes a system and method for providing a current indication of a user's interest by classifying unstructured documents. The present invention avoids the disadvantages of prior systems by gathering behavioral data from a user's activity on Web sites and classifying the documents or actions taken by the user. The user actions may include viewing a document, downloading a document, posting a document, performing a search, responding to a survey, and the like. The classification mechanism and system architecture of the present invention enables tagging, categorizing, and cataloging information based on its content. The present invention includes a system and a method of combining user profile information with collaborative and editorial data to provide users with credible information regarding information, goods, and services.

The present invention extends the functionality of current user profiling and content delivery systems by providing a system and a method for building a user profile and targeting delivery of content to the user. A system and method in accordance with the present invention identifies a document that a user accessed, parses the document to identify and analyze discrete information items, and labels and stores the discrete information items as sets of taxonomic nouns. Taxonomic nouns are classifiable words used to help categorize documents and other content. The system and method further accumulates user behavior characteristics that are indicative of actions taken by the user. The user behavior characteristics provide context under which a document or information item is offered. The system and method of the present invention labels and stores the accumulated user behavior characteristics and builds a user profile based upon the sets of taxonomic nouns and the user behavior characteristics. The user profiles are collections of textual snippets of information about a user. As discussed above, these snippets of information are the nouns. The types of nouns include demographic nouns and taxonomic nouns.

The system and method of the present invention harvests sets of taxonomic nouns, builds structure around those nouns, and builds a classification scheme of the documents, such as a content profile. By creating a personalized user profile and a classification scheme of documents, the system and method of the present invention may identify customized and predictive target content based upon the user profile built and deliver the targeted content to the user. In this fashion, a personalization engine is created to identify users and to target relevant content to deliver to those users. The targeted content may provide a look and feel to the individual content or to a greater user experience, such as an advertising campaign, a branding strategy, a purchase experience, and the like. Additionally, the manner in which the targeted content is delivered provides a user a context under which the user may wish to acquire the document or the asset described in the document.

The system and method of the present invention may further label and store user registration information as demographic nouns and build the user profile based upon the taxonomic nouns, the user behavior characteristics, and the demographic nouns. The user profile may be built to represent the user's interests and to aggregate similar users into categories to allow reporting on the overall audience and targeting for content, advertisements, direct marketing, email marketing, and the like. A user value may be determined based upon the number and type of content delivered and the characteristics of the user.

The personalization engine of the present invention provides customization of content delivery by extracting and analyzing key concepts and items of information that users make known to the system. The system and method extracts key concepts from documents, associates users with those key concepts to build a behavioral profile, merges demographic information from other sources to build an overall profile of a user, and aggregates similar users for delivery targeting and for audience profiling. Trends in user behavior, user interests, and technology configurations may be tracked to identify user involvement levels and trends. The system and method of the present invention uses sets of taxonomic nouns gleaned from the items of information users provide to the system as well as demographic nouns and user behavior characteristics to match content to users.

The present invention may be used to classify or categorize software files ("files") but is intended to cover additional content items such as games, music, computer programs, multimedia content, RSS feeds, and other goods and services that may exist in a less-physical form than a concrete product. One of ordinary skill in the art would understand that the term "content" or "document" should also be extended to encompass these other goods and services as well. For brevity, the terms "document" and "content" and "resource" and "Web page" and "advertisement" and "goods" and "services" and "assets" as used in conjunction in disclosing the present invention may be used interchangeably and should be understood to cover these other items and other similar goods and services as well.

The personalization engine system and method of the present invention includes a content analysis system, a user profiling system, a targeting system, and a brokering system, including server and client components for each system. The system and method of the present invention enables accurate user profiling and content examination to deliver relevant content to users and to predict which users will be interested in which additional content. Likewise, the system and method of the present invention includes predicting which goods and services a user will be interested in based upon past user behavior and past user purchases. The system and method of the present invention allows content to be served statically or dynamically, as well as providing other content controls. By efficiently classifying users and content, the system and method of the present invention characterizes users and content to engage users and to deliver valuable content to the users.

FIG. 1 illustrates an exemplary personalization engine computer system 100 in which processes and methods in accordance with the present invention may be performed. As shown in FIG. 1, personalization engine system 100 comprises a client-side user 101 as well as a personalization engine server 150. A user 101 may be an individual, group, organization, client, server, and the like. Users, such as client-side user 101 may access personalization engine server 150 performing a method in accordance with the present invention. For clarity and brevity, in FIG. 1 a single client-side user 101 is shown, but it should be understood that any number of client-side users may use personalization engine system 100 with which to perform methods in accordance with the invention and with personalization engine server 150. Personalization engine server 150 may include content analysis server 160, user profiling server 170, and targeting server 180.

In addition, the personalization system 100 may also include registration system server 120, content provider site server 130, and content creation site server 140. User 101 and the various servers 120, 130, 140, 150, 160, 70, 180 interact with each other through computer network 198, such as the Internet, an intranet, or other computer network. A user may register with a Web service provider as one way of providing demographic nouns. The user provides personal and professional information that the personalization system 100 uses to characterize the user by way of demographic nouns. Demographic nouns are words or series of words that describe the user as part of a group or segment of the population. Such segments may include a user's name, address, company, job function, industry, age range, marital status, social class, gender, profession, education level, and other characteristics that may provide information about a user to conceptually create a hypothetical aggregate. These items may be explicitly obtained from a user's registration data or by mining registration data not explicitly provided.

The nouns may be added to a user's profile in a number of ways, including deriving the demographic nouns from an explicit association of nouns with users, based on sources such as items listed in the professional interests and current technology implementation settings in the users' profiles. The nouns may also be explicitly associated with users by way of companies, topics or keywords associated with user e-mail alerts and newsletter subscriptions.

Additionally, the nouns may be derived from an implicit association with users, based on actions such as downloading a white paper about a topic, a company, or a keyword. The nouns may also be derived by starting or replying to a discussion about a topic, a company, or a keyword and by writing a blog about a topic, a company, or a keyword, or by responding to surveys about current and planned IT priorities, for example.

The nouns for each user may be aggregated into a simple, unweighted, unique list for the user to help form the user's profile. The number of nouns in the profile is considered to be the "value" of a user. These profile definitions and value metrics may be evaluated, edited, and refined, depending on specific applications. For example, the nouns might be weighted, or rolled up into a smaller set of higher level topics, to make the profiles more amenable for user targeting purposes.

Figure 2:
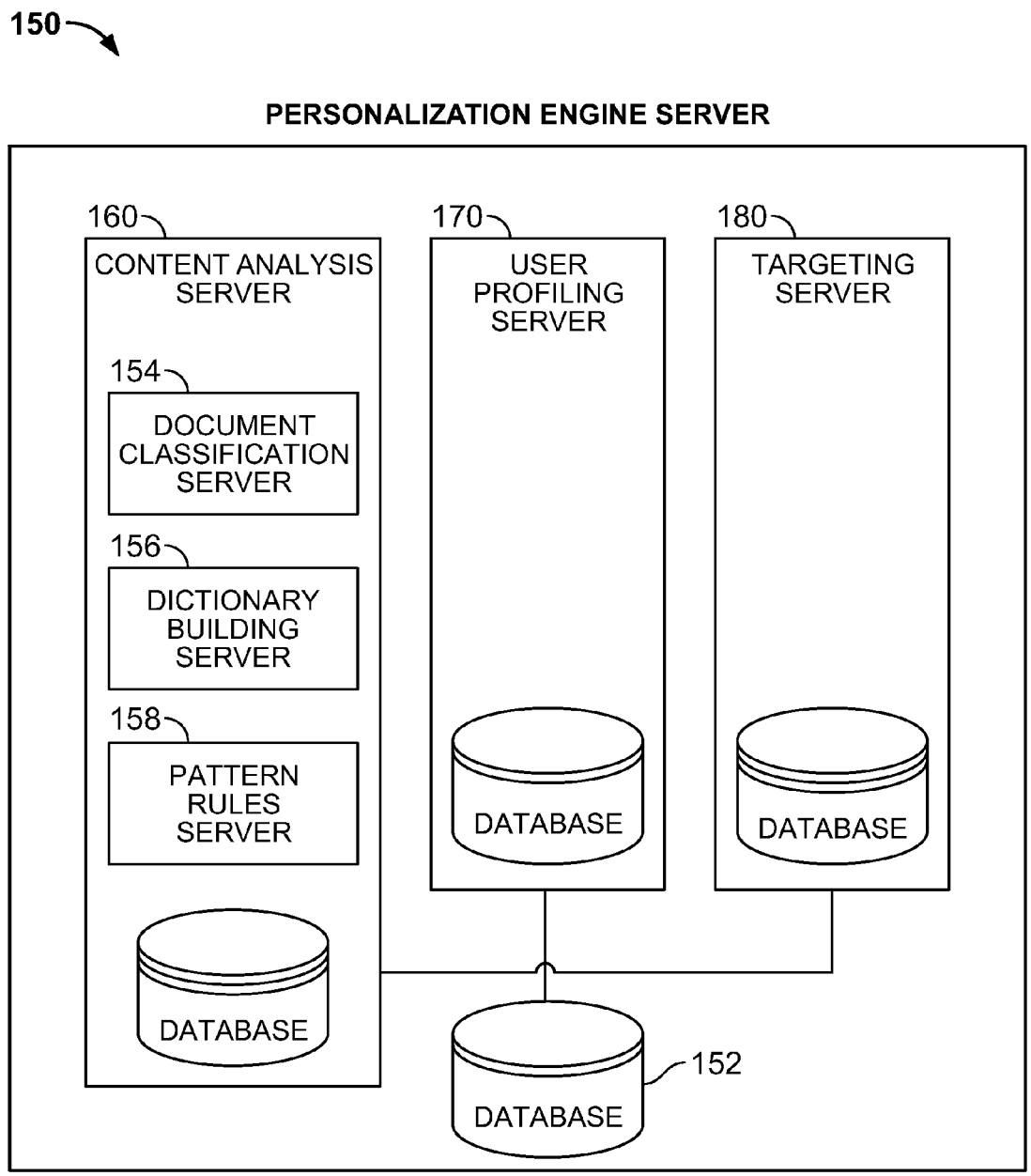
FIG. 2 illustrates a personalization engine server in accordance with the present invention.

As shown further in FIG. 2, personalization engine server 150 may include a file storage database 152. File storage database 152 may be integral to personalization engine server 150, or it may be located separately from personalization engine server 150. Database 152 may also be a network of databases as well, connected to personalization engine server 150 or accessible by personalization engine server 150. Likewise, it should also be understood that any number of personalization engine servers might be used by the system. Multiple personalization engine servers may be segregated by geographic location, by the type or number of files that they offer, or by any number of criteria commonly used to configure server farms, Web farms, or otherwise distribute computing resources and workloads between multiple computers and multiple modules. Multiple personalization engine servers provide alternative points from which files and content may be accessed. Multiple personalization engine servers also provide authentication and service points where each server supplies portions of the related profiling and targeting process to the user, reducing the cost and burden on any given individual source, providing redundancy against system problems, reducing dependence on a single distributor, and improving transmission speed.

For clarity and brevity, a single personalization engine server 150 comprising content analysis server 160, document classification server 154, dictionary building server 156, database 152, and pattern rules server 158 is shown. It should also be understood that a user 101 and a personalization engine server 150 may be substituted for one another. That is, any user 101 may provide profiling and targeting functions for related files and content housed and stored by another user. Personalization engine server 150 is illustrated as component server modules 152, 154, 156, 158, 160 merely to show a preferred embodiment and a preferred configuration. The content can be determined, accessed, and transferred in a distributed environment, such as by multiple servers on the World Wide Web.

Figure 3A:
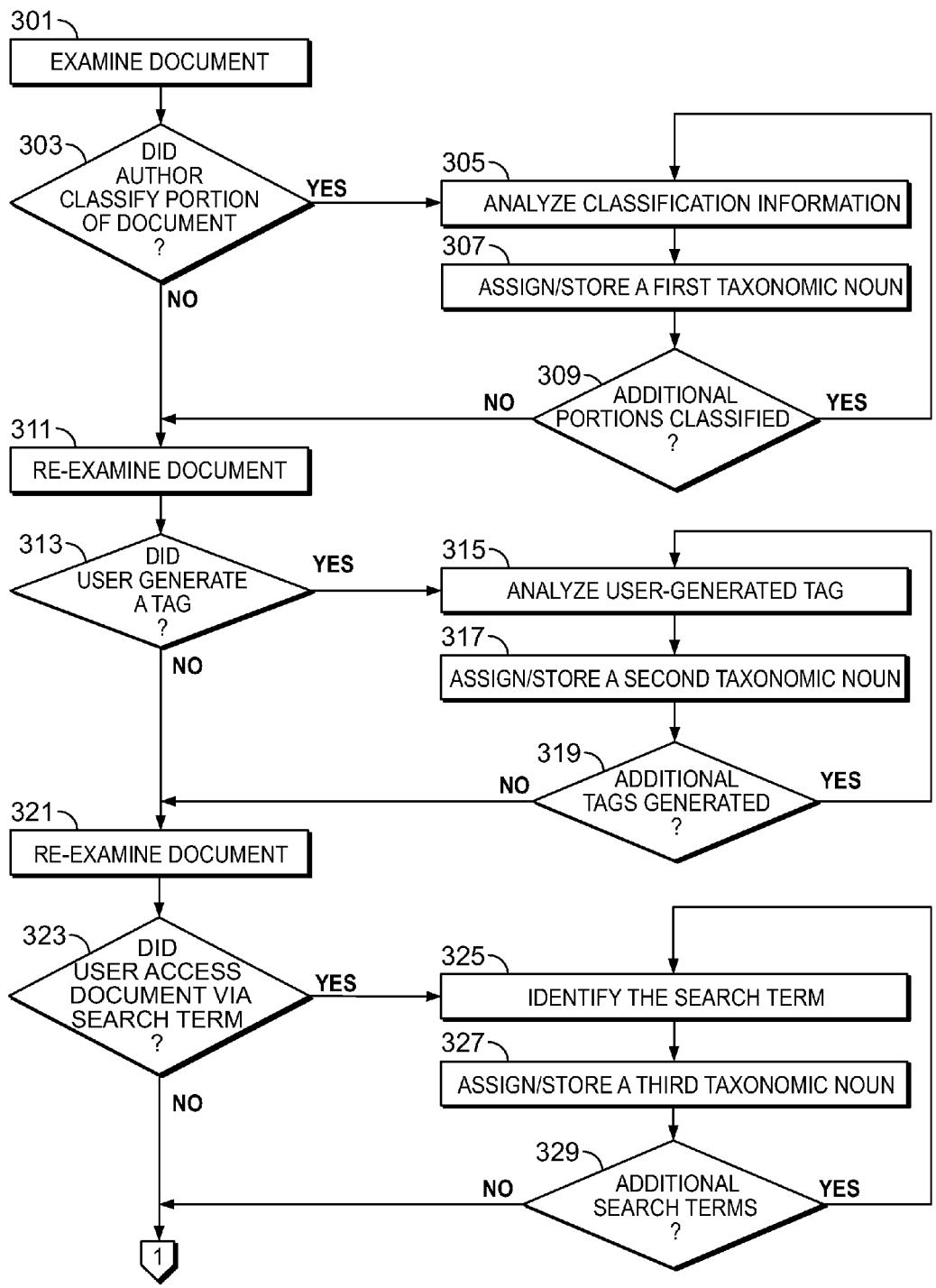
FIGS. 3A-3C are process flow diagrams that illustrate a method for classifying an electronic document in accordance with the present invention.
Figure 3B:
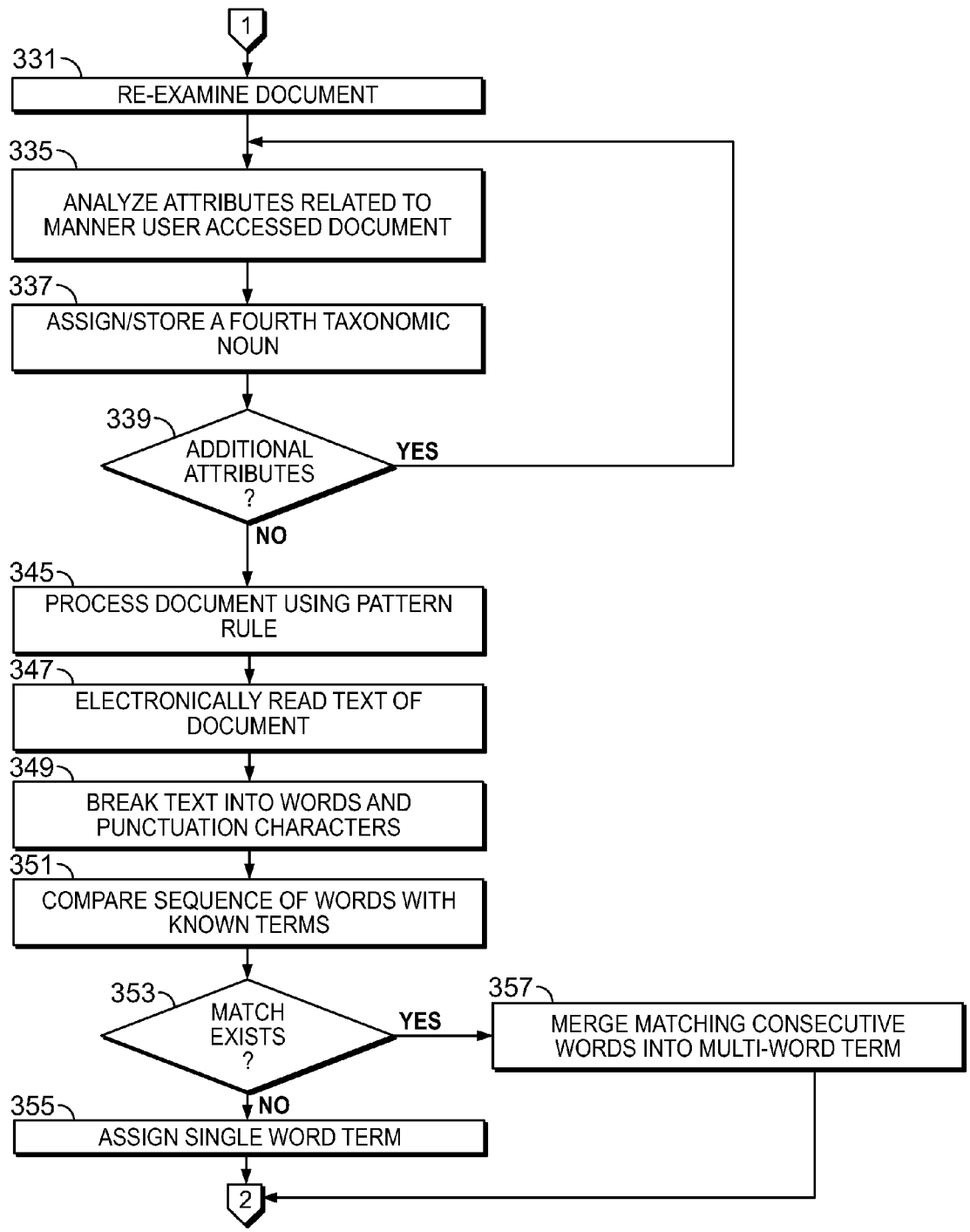
Figure 3C:
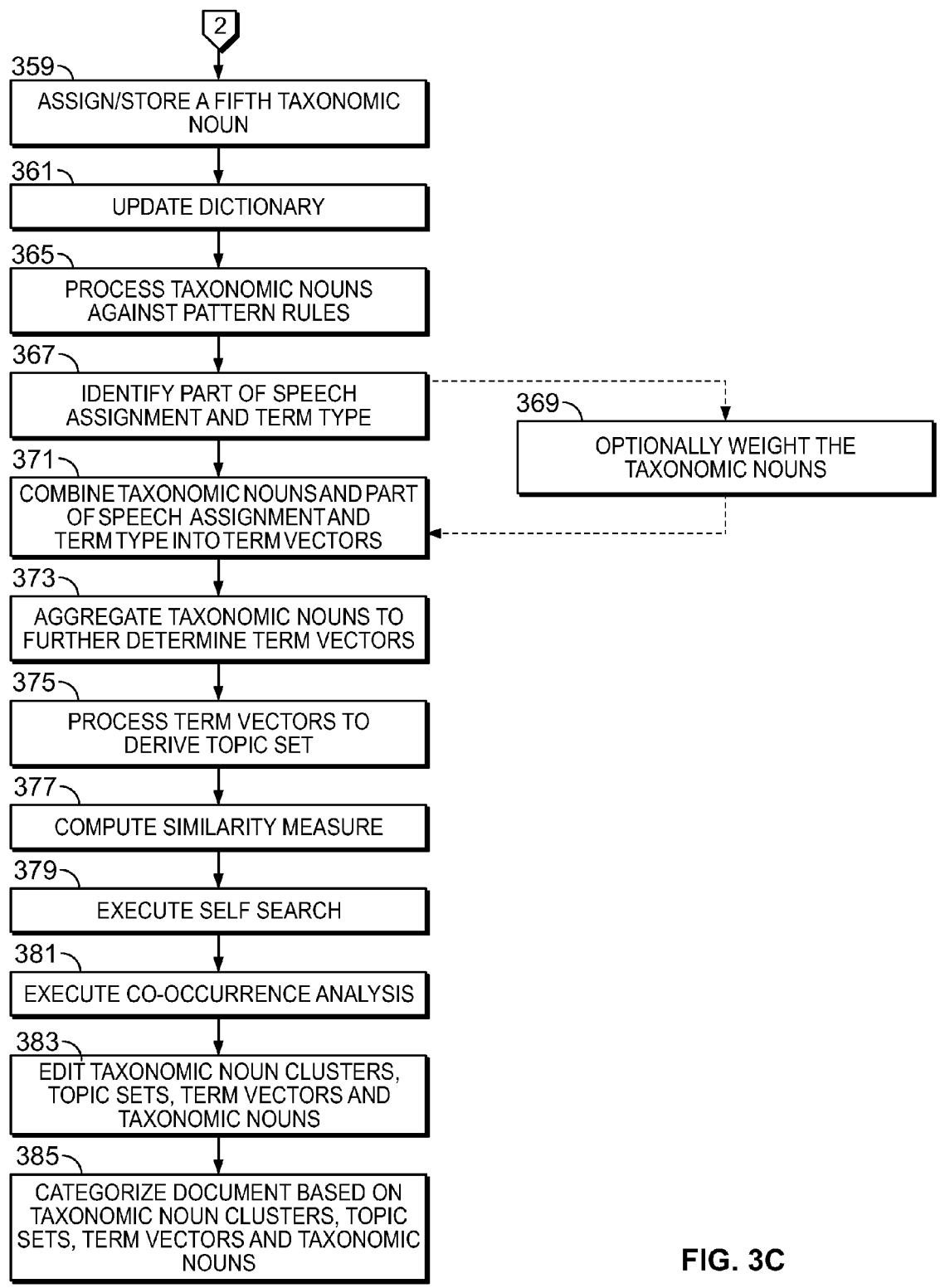

FIGS. 3A-3C are process flow diagrams that illustrate a method for classifying an electronic document in accordance with the present invention. The process begins in step 301 by examining a document. An author may classify a document or a portion of a document to provide details regarding the form, structure, content, and function of the document or the portion of the document. In step 303, the process determines if an author classified a portion of the document. For example, author-generated classification information may be metadata assigned to the document or to a portion of the document. If an author provides such details, in step 305, the method of the present invention analyzes the author-generated classification information regarding the document and assigns and stores a first taxonomic noun to characterize the document based upon the author-generated classification information. If, in step 303, there is no author-generated classification information, the process continues to step 311, where the document is reexamined. There may be a single author-generated classification, or there may be multiple author-generated classification information items. In step 309, the process checks to determine if there are additional portions of the document that the author classified. If there is additional author-generated classification information, the process returns to step 305, and the additional author-generated classification information is analyzed. When the process completes analysis of all the author-generated classification information and assigns and stores a set of first taxonomic nouns to characterize the portions of the document, the process returns to step 311. As indicated above, the system and method of the present invention analyzes the existing author-generated classification information if any is present, the system and method assigns a set of first taxonomic nouns to characterize the document. The set of first taxonomic nouns may include zero objects (that is "nouns") and other whole numbers of nouns. The other sets of taxonomic nouns may similarly include whole numbers of objects (nouns).

In step 311, the document is re-examined to determine if a user generated a tag to characterize the document or a portion of the document to also provide details regarding the form, structure, content, and function of the document. A user may specify an interest in a document by indicating such an interest in a user profile or by otherwise providing user information, including demographic data. First names, last names, user names, job titles, companies, countries, zip codes, addresses, cities, states, provinces, phone numbers, job functions, industries, interests, technological configurations (for example, computer set-ups), and the like all provide user tag information.

In step 313, the process determines if a user generated a tag, and in step 315, if a user-generated tag exists, the system and method of the present invention examines the user-generated tag characterizing a portion of the document. In step 317, the process assigns and stores a second taxonomic noun to characterize the document based upon the user-generated tag characterization. The user-generated tag characterizing the document or the portion of the document may include an item listed in a profile of the user or a technology implementation setting, such as the Internet Service Provider, a network configuration, a user computer system, and the like. If, in step 313, there is no user-generated tag, the process continues to step 321, where the document is reexamined. There may be no user-generated tag information, there may be a single user-generated tag, or there may be multiple user-generated tags. In step 319, the process checks to determine if there are additional portions of the document that a user tagged to characterize that portion of the document. If there is additional author-generated classification information, the process returns to step 315, and the additional user-generated tag information is analyzed. When the process completes analysis of all the user-generated tag information and assigns and stores a set of second taxonomic nouns to characterize the portions of the document, the process continues to step 321. As indicated above, the system and method of the present invention analyzes any existing tags and assigns a set of second taxonomic nouns to further characterize the document. The personalization engine of the present invention also provides page generation by keyword where Web pages or other document content is generated from user tags by building a search frequency keyword index and generating Web pages based on user tags associated with frequent keywords or user comments associated with keywords in the index.

In step 321, the document is re-examined to determine if the user accessed the document by way of a search term or terms. For example, a user may search for content (a document) or a particular topic. The user may begin a search by entering a keyword or keywords as search terms. A user searching for information on Voice over Internet Protocol may enter "VoIP" as a search term, and a relevant document related to VoIP may be delivered to the user or otherwise accessed. Additionally, the system and method of the present invention may suggest search terms to a user based on past searches conducted by the user or by other users who may share similar demographic nouns, taxonomic nouns, or user behavior characteristics. Search suggestions may also be provided to a user based upon a catalog classification system of terms, products, assets, and the like.

In step 323, the process makes the determination as to whether the document was accessed via a search term, and in step 325, if the user accessed the document by way of a search term or terms, the system and method of the present invention identifies the search term or terms that resulted in the user accessing the document. In step 327, the process assigns and stores a third taxonomic noun to characterize the document based upon the search term result. If, in step 323, there were no search terms used with which the document was accessed, the process continues to step 331 in FIG. 3B, where the document is reexamined. There may be no search terms that resulted in the user accessing the document, there may be a single search term, or there may be multiple search terms. In step 329, the process checks to determine if there are additional search terms that resulted in the user accessing the document. If there are additional search terms, the process returns to step 325, and the additional search terms are analyzed. When the process completes analysis of all the search terms and assigns and stores third taxonomic nouns to characterize the portions of the document, the process continues to step 331. As indicated above, the system and method of the present invention analyzes any search terms and assigns a set of third taxonomic nouns to further characterize the document.

In step 331, the document is re-examined to analyze attributes related to the manner in which the user accessed the document. For example, a user may take an action to access a document, such as clicking on a newsletter to reach a Web cast on data storage. In this example, the access was provided by clicking on a link, and the attribute would be "data storage." Additionally, the activity on a particular Web site may also provide attributes related to the manner in which a user accessed the document. For example, the last site activity date, last click date on a newsletter subscription, newsletters by topic or title, discussion groups, technical Q & A sessions, blogs, reviews, page views from user posts, documents forwarded to friends, directories, assets, membership numbers, and the like all provide attributes related to the manner in which a user accessed the document.

In step 335, the system and method of the present invention analyzes the manner in which the user accessed the document. In step 337, the process assigns and stores a fourth taxonomic noun to characterize the document based upon the attributes related to the manner in which the document was accessed. The attributes related to the manner in which the user accessed the document may include a network type used to access the document, an additional Web site from which the document was accessed, an electronic correspondence to which the document was associated, a time of day the document was accessed, a referrer who directed the user to the document, a document category used by a repository storing the document to describe the document, and similar attributes. Similarly, the attributes related to the manner in which the user accessed the document may include a click rate indicating a level of a user's relative interest in the document in relation to other documents available to the user. There may be more than one attribute related to the manner in which the user accessed the document. In step 339, the process checks to determine if there are additional such attributes. If there are additional attributes, the process returns to step 335, and the additional attributes are analyzed. When the process completes analysis of all the attributes related to the manner in which the document was accessed, the process assigns and stores a set of fourth taxonomic nouns to characterize the document in step 337. The process then continues to step 345.

In step 345, the unstructured electronic document is processed based upon a pattern rule and a dictionary of known terms. The unstructured document is ultimately converted into structured term vectors. That is, the system and method of the present invention processes the document to extract a set of fifth taxonomic nouns to characterize the document based upon a predetermined pattern rule, and the set of fifth taxonomic nouns is adapted to term vectors. The term vectors are an array of terms (taxonomic nouns) found in the document text, along with attributes and statistics for each term. These attributes and statistics are listed in Table 1 below.

TABLE 1

| Field name | Description |
|---|---|
| Term | The extracted term |
| Term type | The type of the term (see Table 5 below) |
| Term flag | A flag that indicates whether the term is a known term from the dictionary (1), an unknown term (0), or an unknown term with a high likelihood of being a "valid" term (9) |
| Occurs | The number of occurrences of the term in the text |

As shown more clearly in FIG. 2, term extraction is carried out by a system component called the content analysis server 160, which makes use of a dictionary of known terms (taxonomic nouns) from dictionary building server 156 and database 152 and a set of pattern rules to drive the text analysis process. The system and method of the present invention uses the content analysis server 160 to read the free form text of a document and break it down into a series of single words and punctuation characters. Content analysis server 160 identifies the words and provides an occurrence count. Content analysis server 160 may also be used to build an overall list of terms and their corpus-wide document and occurrence counts. The terms may include simple nouns, noun phrases, and proper names, such as company names, product names, person names, location names, and the like. The text analysis workflow is depicted schematically in FIG. 4.

For example, returning to FIG. 3B, in step 347 the process electronically reads the text of the document. In step 349, the process breaks the electronically-read text into a series of words and punctuation characters, and in step 351 the process compares sequences of consecutive words with known terms read from an electronic dictionary to determine if a match exists. In step 353, the process determines if a match exists. If a match exists, the method merges matching consecutive words into a single multi-word term. For example, if a sentence or sequence of eight words matched terms read from the dictionary, the matching sequence of single words is combined into a single multi-word term.

When analyzing terms and determining matches, matching rules may be employed. For example, when testing matches, the longest successful match may be selected, and when creating multi-word sequences to match with dictionary terms, sequences separated by a space as well as a hyphen may both be tried. Thus, if there is a term called "application-server" defined in the dictionary, it will match both the hyphenated word "application-server" and the two word sequence "application server."

Additionally, company, product, place, and event names may be matched using a modified case-sensitive method where "Veritas" matches "VERITAS" and "Veritas" but not "veritas," and "eBay" matches "Ebay" and "eBay" but not "ebay," and so on. However, these forms may also be explicitly defined as synonyms for that proper noun in the dictionary, as is the case with "ebay."

Other customized matching schemes may also be defined. For example, company, product and event types, as well as special terms, may be matched in a case insensitive manner. General nouns and basic part-of-speech types such as adjectives, verbs, and the like, match in their exact dictionary form only (typically lowercase), except when they begin a sentence. The reason behind these rules is that a non-lowercase form of any common word can be a proper noun. For example, there are company names called "Sun," "Stratify," "Connected," "Good," and the like.

Certain combinations of hyphenated words may be given special treatment using customized matching rules. For example, a word such as "high-flying" where the first part of the word is an adjective and the second part of the word is a verb gerund is typed as an adjective. Additionally, a pair of company names connected with a hyphen is split into the two individual company names. For example, IBM and Sun may be written in a phrase such as " . . . IBM-Sun collaboration . . . " Of course, other customized matching schemes may also be defined.

If a match of multiple words does not exist, in step 355 the method assigns a single word term to the word as the fifth taxonomic noun. Once a set of fifth taxonomic nouns is assigned and stored, the dictionary of taxonomic nouns may be updated in step 361.

As an example, the following is the text of a sample document and its term vector. The title of the document is enclosed within the "/^h" and "PI" string brackets:

/^h SanDisk rolls out flash hard drives for laptops/^$
<p>
SanDisk wants to replace the hard drive in notebooks with flash memory, a swap that it says will make thin laptops faster and more reliable.
The switch, however, will cost you a few hundred dollars more.
<p>
SanDisk on Thursday released a 32 GB drive for commercial notebooks that stores information on flash memory chips rather than the magnetic platters that make up a traditional hard drive. The drive is available only to manufacturers, and the company declined to give out pricing or identify any notebook makers that will adopt it, but SanDisk said notebooks sporting the drive could come out in the first half of 2007.

The term vector for this sample document is shown in Table 2 below. As described above with regard to FIG. 3, the document entitled "SanDisk rolls out flash hard drives for laptops" is processed based upon a pattern rule and a dictionary of known terms. The system and method of the present invention converts the unstructured document into structured term vectors by processing the document to extract a set of fifth taxonomic nouns to characterize the document based upon predetermined pattern rules, and the set of fifth taxonomic nouns is adapted to term vectors. As shown below in Table 2, the term vectors are an array of taxonomic nouns (terms) found in the document text, along with attributes and statistics for each taxonomic noun.

TABLE 2

| Term | Term type | Term flag | Occurs | Weight |
| --- | --- | --- | --- | --- |
| swap | unknown type | 1 | 1.00 | 0.05 |
| hard drive | product type | 2 | 3.00 | 0.22 |
| notebook | product type | 2 | 4.00 | 0.49 |
| SanDisk Corpp. | company name | 2 | 4.00 | 0.81 |
| dollar | general noun | 1 | 1.00 | 0.03 |
| switch | unknown type | 1 | 1.00 | 0.03 |
| company | general noun | 1 | 1.00 | 0.01 |
| manufacturer | company type | 2 | 1.00 | 0.03 |
| information | general noun | 1 | 1.00 | 0.02 |
| memory chip | product type | 2 | 1.00 | 0.05 |
| pricing strategy | special term | 2 | 1.00 | 0.03 |
| flash memory | product type | 2 | 2.00 | 0.17 |
| laptop computer | product type | 2 | 2.00 | 0.10 |
| notebook company | company type | 1 | 1:00 | 0.05 |
| chip | product type | 2 | 1.00 | 0.03 |
| commercial notebook | unknown type | 0 | 1.00 | 0.00 |
| magnetic platter | unknown type | 0 | 1.00 | 0.00 |
| platter | unknown type | 0 | 1.00 | 0.00 |
| traditional hard drive | unknown type | 0 | 1.00 | 0.00 |

The dictionary includes a set of known terms and their properties maintained in a combination of storage locations, including dictionary building server 156 and database 152, as shown in FIG. 2. A main storage location for dictionary terms may be a database table called WordList. Entries in this table can be created and edited using a dictionary editor tool as shown in FIG. 5. Table 3 below lists the fields for each entry in this table.

TABLE 3

| Field name | Description |
| --- | --- |
| Term id | The number id for the term |
| Term | The dictionary term |
| Term type | The type of the term (see Table 5 below) |
| Term flag | A flag that indicates whether the term is an active term (i.e., verified and available for use), an inactive term (i.e., unverified and not available for use), a stop word, hidden (i.e., not available for use in the business intelligence reporting tool), and keyword (a term that is treated like a special term type and given additional weight in document classification and in tags assignment similar to a special term) |
| Psmask | A set of part-of-speech types for a basic type of term, including noun (n), verb (v), adjective (j), adverb (r), pronoun (co), preposition (i), interjection (u), and conjunction (c) |
| Synonyms | One or more optional synonyms for the term |
| Occurs | The total number of occurrences of the term in all of the documents in the system database. The value is set at the end of a batch mode term extraction. |
| Dcount | The total number of documents in the database in which the term occurs. This value is set at the end of the batch mode term extraction step. |

TABLE 3-continued

| Field name | Description |
| --- | --- |
| IDF | The inverse document frequency of the term based on its occurrences in all of the documents in the system database. This value is set at the end of the batch mode term extraction step. |

The dictionary editor tool may be used to edit the dictionary stored in database 152 and to affect changes in the manner in which dictionary building server 156 applies known terms to content analysis server 160 to derive the set of taxonomic nouns. The dictionary editor tool may be used to view, analyze, and edit a term 505, term type 507, flag 509, part-of-speech type 511, synonyms 513, and other data characteristic of a term.

As described in Table 3, the fields displayed using the dictionary editor tool provide additional information to the terms themselves as well as details regarding the manner in which the terms are applied in analyzing a document and producing term vectors. The dictionary editor tool provides an interactive manner of refining text analysis and generation of the term vectors by flexibly modifying the stored terms and term characteristics.

In addition to the main storage data table, the other storage locations may include two external data files. For example, the external files may be called basicwords.txt and commonstop.txt, which contains words that are more-or-less independent of a specific domain. The file basicwords.txt contains a basic set of English language words, including words whose part-of-speech type cannot be represented in the term type and psmask fields in the dictionary table (such as "may" whose part-of-speech type is modal).

One feature of the dictionary and the dictionary editor tool is the fine-grained noun term types (shown as reference numeral 515 in FIG. 5) such as company name, product type, place name, and the like, that can be assigned to terms. Table 3 above includes a list of term types. This feature enhances the richness of the meta-information that be leveraged for the extracted terms and also enhances the richness of the pattern rules that can be coded for part-of-speech typing. Another feature of the dictionary and dictionary editor tool is the ability to define synonyms 513 for each term, which allows terms like "Big Blue" to be equated to "IBM Corp." in a straightforward manner.

Figure 4:
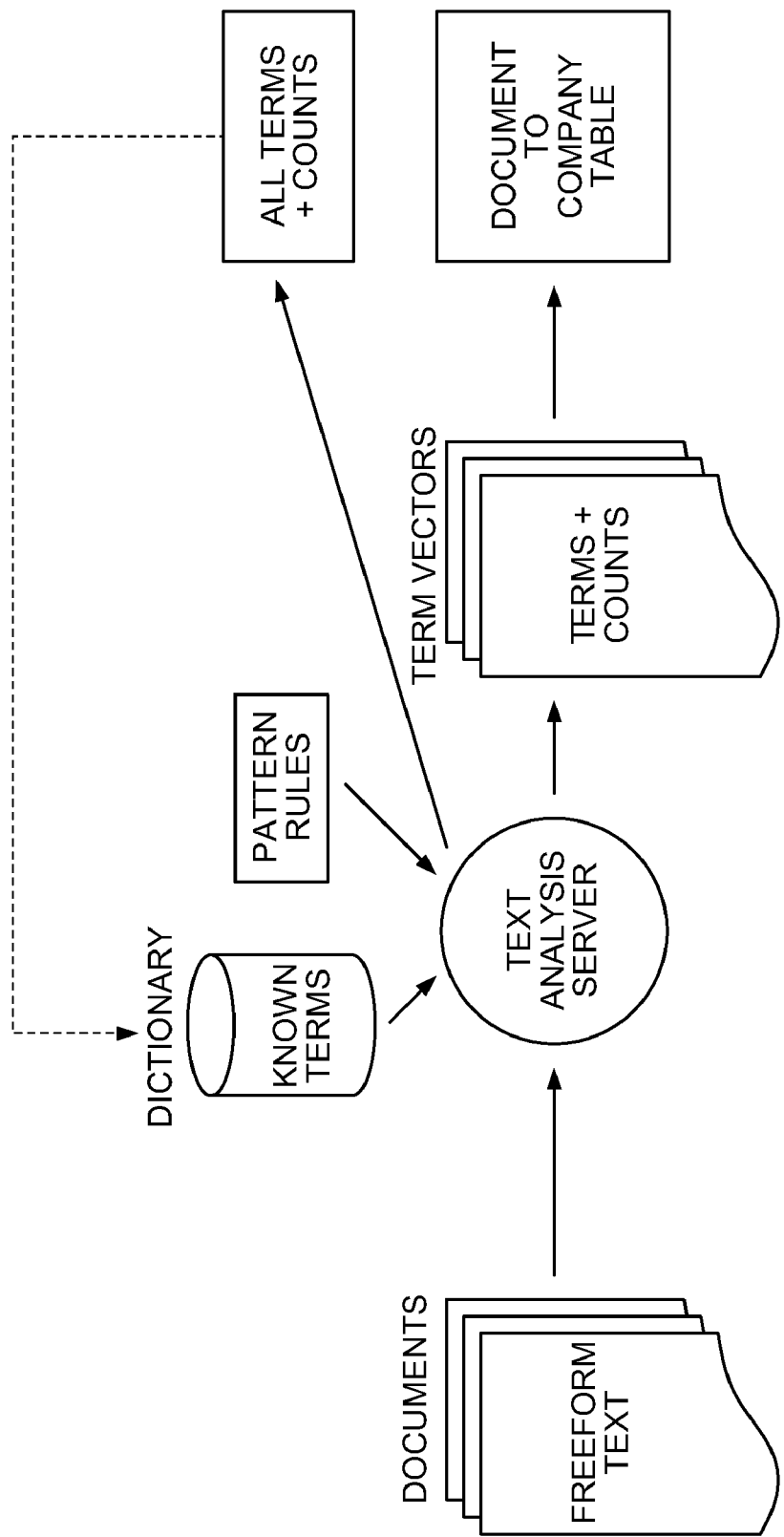
FIG. 4 illustrates a schematic depiction of a text analysis workflow process in accordance with the present invention.

Continuing with the method of the present invention, in FIG. 3C the method then processes the terms against a set of pattern rules in step 365 and as also shown in FIG. 4. The content analysis server 160 runs the partially type-assigned word sequences against the set of pattern rules. These pattern rules serve as templates for performing part-of-speech typing and/or the term type assignments, and fill in the part-of-speech type values and/or term type values for the remaining untyped words. These rules can also cause multiple words to be combined into a single term as outlined above. For example, a sequence of successive non-lowercase words may be combined into a single multi-word proper noun.

The content analysis server 160 of the present invention incorporates a pattern rules engine 158 to perform part-of-speech typing. The rules used by the pattern rules engine 158 may be stored in an external text file called xformrules.txt, for example. The text file may be stored in an integral database (not shown) or as part of database 152. The types of pattern rules include contextual rules and morphological rules.

A contextual rule attempts to assign part-of-speech types to untyped words in a partially typed sequence of words, based on their surrounding context of other (typed) words. A contextual rule includes a series of match templates that are compared with a sequence of words in the text. Each match template attempts to match one word in the sequence. One match template in the sequence is special and contains an assignment component that specifies a part-of-speech type to be assigned to an untyped word. If all templates in the rule match all words in a sequence, an untyped word corresponding to the special match template is assigned the part-of-speech type specified in that template.

This contextual rule process is further illustrated by some example rules listed below in Table 4.

TABLE 4

| Contextual rule | Word sequence | Explanation |
|---|---|---|
| "a"/DT\|"an"/DT /ORGT "named" /VBD /_:UCM=ORGN | A manufacturer named Xyz . . . | Matches the sequence "A[n] <company-type> named <unknown uppercase-capitalized-or-mixedcase word> and assigns the POS type <company-name> to the unknown word Xyz (where manufacturer is known to be a company type from the dictionary) |
| /PRP$ /_:L=NN /POS | Their teen's . . . | Matches the sequence "<possessive-pronoun> <untyped lowercase word> apostrophe" and assigns the POS type <general noun> to the word teen |
| "said"/VBD (/_:UCM /_:UCM) ","/PUNC /PERT =PERN | . . . said Bill Gates, chairman . . . | Matches the sequence "said <pair of unknown uppercase-capitalized-or-mixedcase words> comma <person-type> and assigns the POS type <person-name> to the two unknown words, simultaneously combining them into one word "Bill Gates" (where chairman is known to be a person type from the dictionary) |

Additional pattern rules include both simple, common-English rules, such as the rule/DT/_:L=NN/VBZ which specifies that in a sequence consisting of an article/determiner (such as "the"), followed by an unknown lowercase word, followed by a present tense verb, the middle unknown word should be typed as a noun. The pattern rules may also include more complex, domain-specific rules, such as the rule "said-"NBD (/_:UCM/_:UCM)","/PUNC/PERT=PERN which specifies that in a sequence consisting of the past tense verb "said," followed by two unknown non-lowercase words, followed by a comma, followed by a person type term (e.g. "CEO"), the two unknown non-lowercase words should be combined into one term and typed as a person name.

The pattern rules also may also include morphological rules which can be used to translate a word from one basic part-of-speech type to another to help identify its type. For example, the rule –iful+y NN=JJ specifies that if you delete the suffix "–iful" from a word ending with that suffix and add "y" to the prefix, and the new word is a known noun, then the original word is an adjective. This rule would translate the unknown "beautiful" into a known noun "beauty," which results in the word "beautiful" being typed as an adjective. These rules allow the ability to store just one part-of-speech form of a word in the dictionary and derive the types of other part-of-speech forms, simplifying dictionary management. The pattern rules server 158 repeatedly executes the pattern rules until no rules match at the current text location in the document.

In the system and method of the present invention, text analysis and term extraction focuses on "noun" terms, including common nouns, proper nouns, and noun phrases. However, other part of speech words such as verbs are identified in the text analysis processing and may also be included in the output term vector. Table 5 below shows a number of examples of types of noun terms that may be extracted.

TABLE 5

| Term type | Description | Examples |
|---|---|---|
| General noun | A common English noun, typically just one word | ability, concession, path |
| Company name | A proper noun that is a name of a company | CNET Networks Inc., IBM Corp., Apple Inc. |
| Company type | A noun or phrase that is a type of company | Semiconductor manufacturer, operating system vendor |
| Product name | A proper noun that is a name of a product | Microsoft Vista, Apple iPhone |
| Product type | A noun or phrase that is a type of product | semiconductor, operating system |
| Person name | A proper noun that is a name of a person | Bill Gates |
| Person type | A noun or phrase that is a type of person | director of marketing, senior analyst |
| Place name | A proper noun that is a name of a place | Boston, San Francisco |
| Place type | A noun or phrase that is a type of place (not currently used) | — |
| Event name | A proper noun that is a name of an event | COMDEX |
| Event type | A noun or phrase that is a type of event (rarely used) | conference, trade show |
| Special term | A noun or phrase that is a technical or business (i.e. domain-specific) term. This is kind of a catch-all category for nouns that don't fit any of the above types | Voice over IP (VoIP), Sarbanes-Oxley (SOX), computer management |
| Unknown type | A basic part-of-speech type with one or more part of speech values, or an unknown type | help (both noun and verb), still (noun, verb, adverb) |

The text analysis method and system uses the following part-of-speech types listed below in Table 6. Many of the basic part-of-speech types may be used to support term extraction and named entity recognition, while additional part-of-speech types may be added or removed to further improve and refine term extraction and named entity recognition.

TABLE 6

| Type code | Description |
|---|---|
| Basic Part of Speech Types | |
| CC | Coordinating conjunction |
| CD | Cardinal number |
| DT | Determiner |
| EX | Existential "there" |
| FW | Foreign word |
| IN | Preposition or subordinating conjunction |
| JJ | Adjective or ordinal numeral |
| JJR | Adjective, comparative |
| JJS | Adjective, superlative |
| LS | List item marker |
| MD | Modal |
| NN | Common noun, singular or mass |

TABLE 6-continued

| Type code | Description |
| --- | --- |
| NNP | Proper noun, singular |
| NNPS | Proper noun, plural |
| NNS | Common noun, plural |
| PDT | Predeterminer |
| POS | Possessive ending |
| PRP | Personal pronoun |
| PRP$ | Possessive pronoun |
| RB | Adverb |
| RBR | Adverb, comparative |
| RBS | Adverb, superlative |
| RP | Particle |
| SYM | Symbol |
| TO | "to" |
| UH | Interjection |
| VB | Verb, base form |
| VBD | Verb, past tense |
| VBG | Verb, gerund or present participle |
| VBN | Verb, past participle |
| VBP | Verb, non-3rd person singular present |
| VBZ | verb, 3rd person singular present |
| WDT | Wh-determiner |
| WP | Wh-pronoun |
| WP$ | Possessive wh-pronoun |
| WRB | Wh-adverb |
| *Customized Part of Speech Types* | |
| NUL | Null type |
| UNK | unknown type |
| NVBG | Common noun; or, verb, gerund or present participle (e.g. planning, networking) |
| NVBZ | Common noun, plural; or, verb, 3rd person singular present (e.g. plans, networks) |
| PUNC | Punctuation |
| DOW | Day of week |
| CUR | Currency |
| ORGN | Company name |
| ORGT | Company type |
| PRDN | Product name |
| PRDT | Product type |
| PERN | Person name |
| PERT | Person type |
| LOCN | Place name |
| LOCT | Place type |
| EVTN | Event name |
| EVTT | Event type |
| EOF | End of file |

Returning to FIG. 3C, in step 367 the method of the present invention identifies a part of speech assignment and a term type assignment. In step 371, the method combines the terms and the part-of-speech assignment and the term type assignment into a structured term vector. Additionally, processing the document may optionally include weighting the sets of taxonomic nouns using a predetermined weighting scheme, as in step 369. The weighting scheme may account for systematic differences in the predicted variability of taxonomic noun assignments if the assignments were repeatedly carried out many times. Of course, other weighting schemes may be employed to improve the information content of the taxonomic nouns as well.

In step 373, the system and method of the present invention aggregates the sets of taxonomic nouns to determine term vectors that represent the document and categorizes the document based upon at least one of the term vectors, the taxonomic nouns, and the author-generated classification scheme. Determining the term vectors may include building a list and a count of the sets of taxonomic nouns and applying a dictionary of taxonomic nouns. Similarly, the list of taxonomic nouns may include a document and occurrence count. That is, a count as to the number of times the taxonomic noun appears in a particular document and the number of documents in which the taxonomic noun appears. The dictionary of known taxonomic nouns may be updated throughout the process from the list of taxonomic nouns in the sets to further identify taxonomic nouns in additional documents.

For example, the dictionary may be updated by filtering terms to arrive at relevant taxonomic nouns and to store the relative taxonomic nouns in the dictionary. The terms may be filtered by automatically reviewing all of the terms found for all documents in the database, and using rules that are a combination of statistical attributes and heuristic techniques to identify "clean" terms. For example, a rule may state that single-word nouns identified using morphological rules (e.g. "goodness" from known adjective "good") that occur in lowercase form only are selected as clean terms. Additionally, a rule may identify that single-word nouns that occur in lowercase form only in at least two documents, that do not contain any digits or punctuation characters, and that either occur in a title or are flagged as "standout" in at least one document, are selected as clean terms. Likewise another rule may dictate that terms containing more than one word that occur in both lowercase and non-lowercase forms in at least two documents are selected as clean terms. For example, "Application server" and "application server" are one such pair. Further, a rule may state that terms where another term with the same value but suffixed with "Corp.", "Inc.", "Ltd." and the like are selected as clean terms as long as the term without the suffix is an unknown term. In this fashion, the text analysis process may minimize the dependence on a manually maintained and edited dictionary in the term analysis and extraction step, and increase the reliance and confidence in automated intelligence to identify valid terms and relevant sets of taxonomic nouns.

Once determined, the term vectors may be processed in step 375 to further derive a topic set. As shown further in FIG. 6, the system and method of the present invention supports the creation of a hierarchical taxonomy of topics. A topic set is defined as a set of one or more terms from the dictionary database 152. It is also possible to have a topic with no terms, as is the case of some high-level topics which are defined in terms of their subtopics. In step 377 of FIG. 3C, a similarity measure may be computed between the electronic document and the topic set. A similarity measure provides a relative measure of "how close" in similarity the taxonomic noun and the document are. The similarity measure may include executing a cosine similarity algorithm to determine the topics into which the document can be classified.

Figure 6:
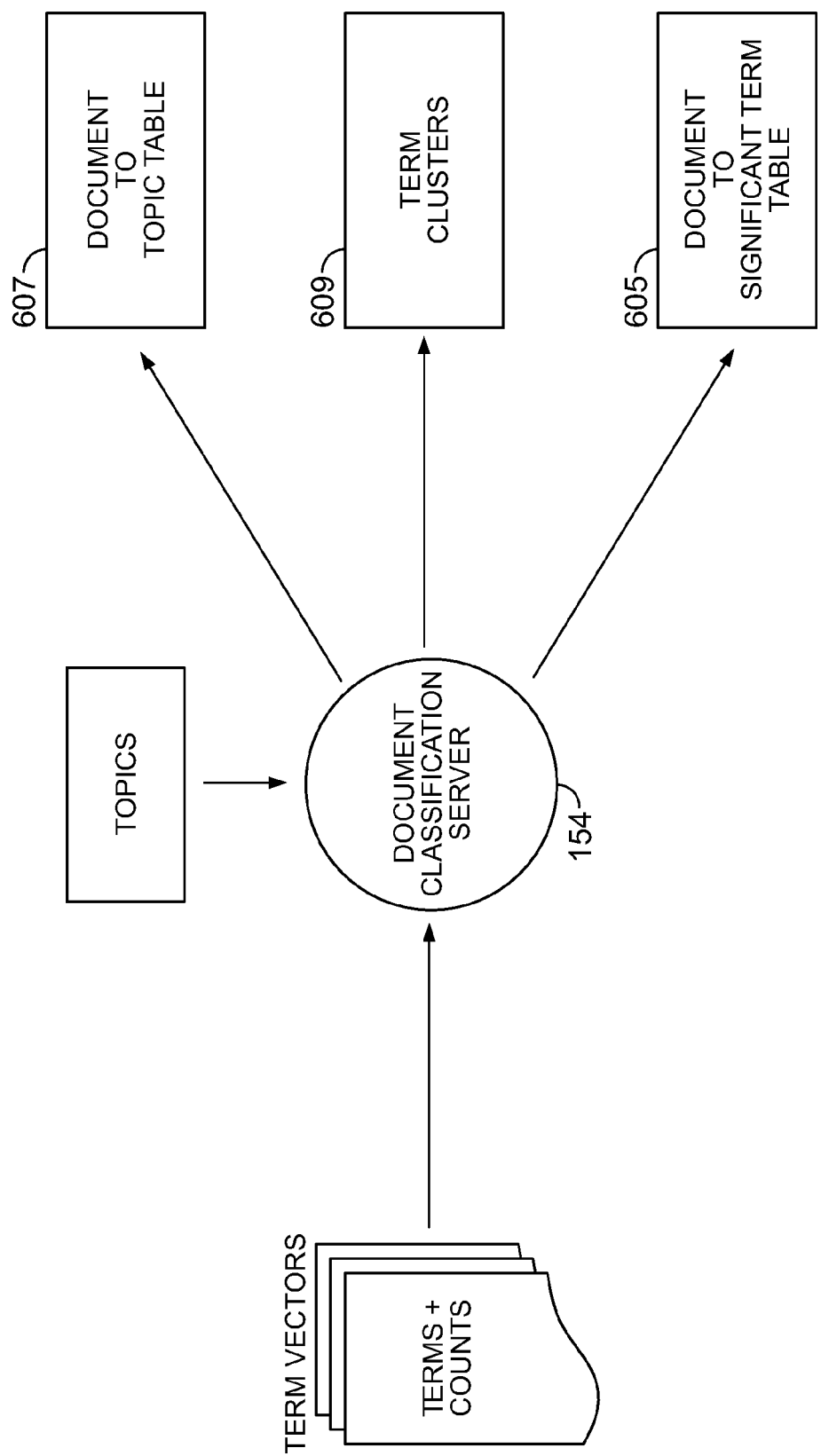
FIG. 6 illustrates a schematic depiction of the document classification workflow process in accordance with the present invention.

As also shown in FIG. 2 and in FIG. 6, document classification is performed by a component called the document classification server 154. Document classification server 154 may be used to identify significant terms for each document and to map the document to a significant term table 605. Likewise, document classification server 154 may classify documents into topics and map the documents to a topic table 607. Further, document classification server 154 may generate term clusters 609. For example, one aspect of the classification process is that the document classification module 154 computes the similarity between documents and topics (that is, sets of taxonomic nouns) to classify documents into applicable topics. This similarity measure may be a cosine similarity algorithm that emphasizes the weights of terms that are of certain types (such as product types or special terms) in order to improve the quality of the results. Further, in step 379 of FIG. 3C, the document classification server 154 may execute a self search process to identify additional taxonomic nouns that may be used to create additional topic sets. Additionally, in step 381 the document classification server 154 executes a co-occurrence analysis to identify and cluster related taxonomic nouns to create a taxonomic noun cluster as described above. Clusters may be viewed and edited using a cluster viewer tool as shown in FIG. 9. In step 383 of FIG. 3C, any of the taxonomic noun clusters, topic sets, term vectors, and taxonomic nouns may then be reviewed and edited to further refine the results and the categorization of the document in step 385.

Figure 7A:
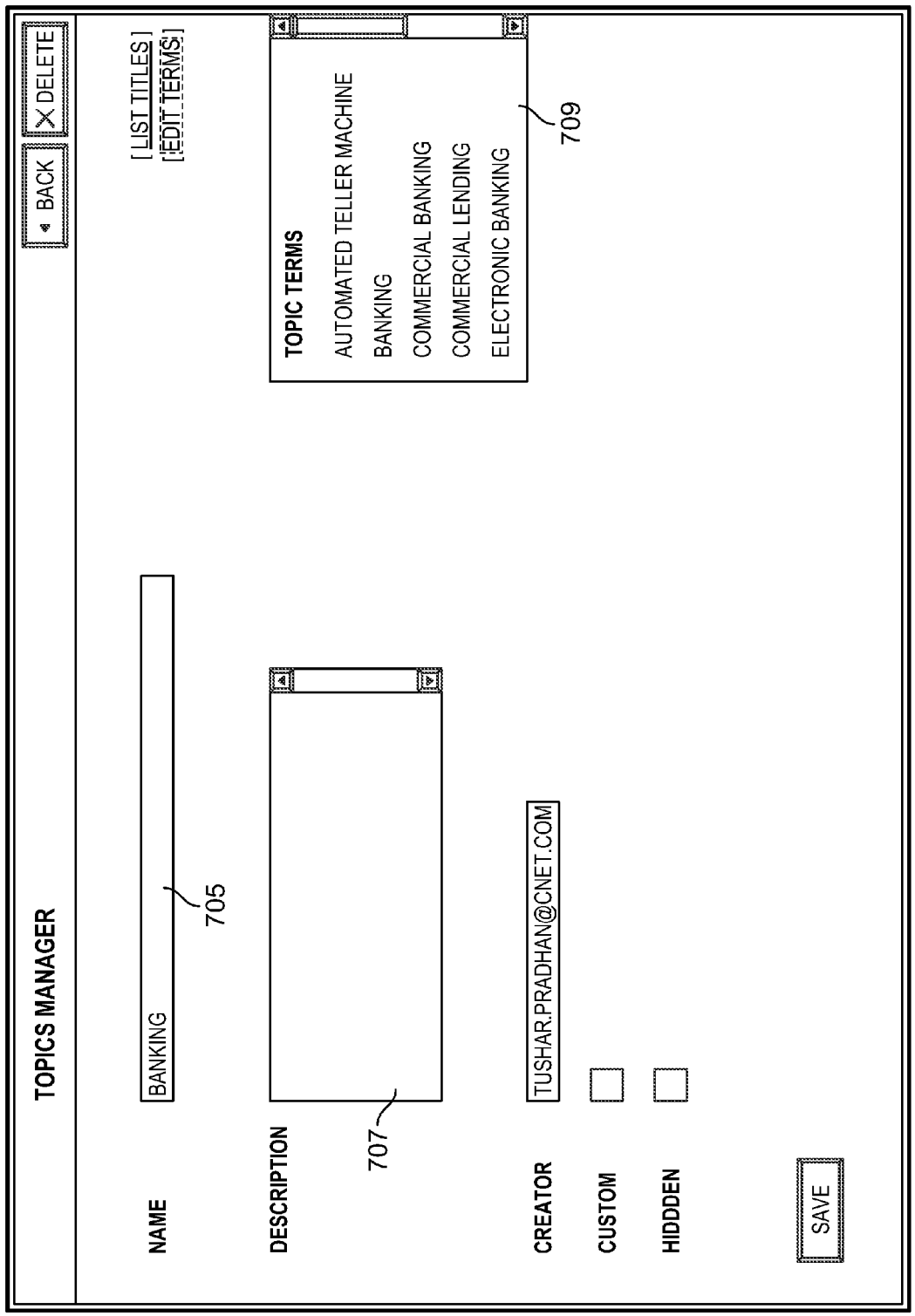

Similarly to the manner in which the dictionary editor tool was employed to edit the dictionary stored in database 152, as shown in FIGS. 7A and 7B, a topic editor tool may be used to view, analyze, and edit a topic 705, topic description 707, topic terms 709, and other data characteristic of a topic. As shown in FIG. 7B, available terms 725 may be added or removed to and from the selected terms 727 used to characterize the topic using the topic editor tool.

As outlined above, by building an accurate user profile based upon taxonomic noun sets, user behavior characteristics, and demographic nouns, the system and method of the present invention may identify valuable users. The system and method of the present invention provides predictive document recommendations based on past user purchases, activities, and behaviors by building a profile of documents or assets used or desired by a user. Based upon the profile building and a technology experience in which the user may be interested, the system and method of the present invention provides document and asset recommendations appropriate to the desired technology experience. A desired technology experience may include, for example, a type of hardware and software configuration that a user employs or would like to employ, as well as a particular time of day, a particular referrer, a network type, and the like.

Tag assignments may also be made to further identify valuable users and to refine value indices. Tags assignment includes identifying the most significant terms from the total set of terms extracted from a document. These "most significant" terms are called "key terms." In addition to the most significant terms, all of the topics assigned to the document in the document classification step are also included as key terms for the document.

Returning to the example document described above, Table 7 below shows the key terms identified in the "SanDisk rolls out flash hard drives for laptops" document along with the occurrence count, "Occurs." The inverse document frequency "IDF" of each term is also shown. The IDF is based on the term's occurrences in all of the documents in the document database. This IDF value maybe calculated after processing (i.e., extracting terms from) a large number of documents. The "Weight" of each of the terms is also shown. As described above, the terms may be weighted based upon the number of unique nouns in the list, may be based upon the type of nouns in the list, or may be based upon another weighting scheme.

TABLE 7

| Key Term | Term type | Term flag | Occurs | IDF | Weight |
|---|---|---|---|---|---|
| Hard Drive | product type | 2 | 3.00 | 3.61 | 0.22 |
| SanDisk Corp. | company name | 2 | 4.00 | 7/50 | 0.81 |
| Laptop Computer | product type | 2 | 2.00 | 3.78 | 0.10 |
| Flash Memory | topic name | 1 | 6.00 | 13.73 | 0.18 |
| Notebooks | topic name | 1 | 6.00 | 8.28 | 0.11 |
| Hardware | topic name | 1 | 0.00 | 0.00 | 0.00 |
| Notebooks & Tablets | topic name | 1 | 0.00 | 0.00 | 0.00 |

The most significant terms in the document are identified by selecting each term in the term vector sequentially and calculating a similarity score between that term and the entire term vector, using a cosine similarity algorithm, for example. If the similarity score is above a determined threshold, the term is selected as a "key term." For example, one similarity score may dictate that a term that is selected as a key term must occur at least twice in the document. An exception may be if the term occurs in the title or the term is flagged as a "standout" term to specifically be excluded. A key term viewer tool may be used to indicate the manner in which key terms are determined. An example screen shot of the key term viewer tool is shown in FIG. 8.

By characterizing documents in this fashion, the system and method of the present invention may extrapolate user characteristics of one valuable user with the characterized documents to determine additional valuable users. Likewise, the system and method of the present invention may identify document characteristics and identify additional documents that may be of interest to a valuable user. That is, the number of documents of interest may increase, existing users may be retained by delivering additional documents of interest to those users, and each user's value index may increase based upon additional user activity and additional documents identified.

To identify additional similar documents, a document similarity measure may be computed. Document similarity measures may include comparing a given document with all other documents in the corpus of documents in a database and generating a ranked list of similar documents. The comparison may be performed by executing a cosine similarity algorithm between the term vectors of the documents to calculate a similarity score between the documents. Documents with a similarity score above a particular threshold may be considered similar to the given document.

Once users and documents are categorized, users may be assigned a value score. For example, a high-level user engagement scoreboard may be used by displaying a 30-day moving average of the total number of active registered users for a brand over rolling 30-day periods, as well as the sum of the individual user's noun counts (the value metric) from their user profiles. Using these metrics, the system and method of the present invention may identify the most valuable users, may identify what the users have disclosed to the system about themselves, identify the activities the users perform on various Web sites, and identify trends among users.

In this fashion, the system and method of the present invention may identify valuable, active, registered users on Web provider sites each day. The system may track who the users are, what they are interested in, and how active they remain. The system can determine if Web service providers are gaining or losing the most active and engaged users month to month. The system can determine this by tracking how many unique nouns per user are stored. The users who take action on those Web service provider sites and gather the most nouns are the most valuable users. A grading system or other hierarchy may be established for our users to identify who are the most valuable.

In order to best serve Web site providers, advertisers, and other stakeholders, the system and method of the present invention may use the profile data to create spots using conditional logic to identify and serve different (target-specific) content to users based on their profile attributes. A spot may be created by selecting a user profile and a user attribute to target against. The user attribute may be evaluated and scored, and different content may be identified and selected for different values of the user profile attribute. Profiles may be lookup tables using a global id (email hash) as the key. Using a Web insert setup tool, spots can be created to serve customized content to individuals based on their profile attributes.

Spots also may become Web page templates, allowing the author or Web site provider to control the presentation of the data. The content served in a spot can be static (directly entered into a spot) or dynamic via an XML feed, for example. The business logic in each spot may be based on one of the profile attributes for an individual.

Each profile attribute value and content pair that is created is called a case. Every spot must have a default case (which the setup tool requires). The default case is served when a profile is not found or when the attribute value for an individual does not match any of the defined cases. The default case can be used to prevent the setup of an exhaustive list of cases when only a few distinct attribute values are in need of targeting, and the rest can be served default content.

For example, customized and predictive targeted content may include an advertising campaign based upon the user profile built. Identifying the content may include segregating test advertising into categories and queuing the test advertising by traffic availability in a category. Additionally, delivering the targeted content to the user may further include delivering partial targeted content based upon category completion.

The content served for a specific case can be static or dynamic. Static content is just plain text or HTML entered for the content of the defined case. Another option is to provide a URL to an XML or RSS feed that will supply data for the case. The case content then becomes a Web page template that presents the data in the XML feed. Another option for providing dynamic content is to create an add-on component. Add-on components are Java servlets that provide custom business logic or add data to the request pipeline that can be used for presentation in the Web page template.

The system and method of the present invention serves to develop a deep understanding of users, their interests and passions, the topics they discuss and debate, the vendors they research and compare, the communities they form, the resources they look for to help with their daily job or personal life, and to leverage this understanding to support and advance Web site provider business goals. The business goals may include improving business processes relating to sales and marketing efforts, improving user experiences with content and community relevancy, providing more dynamic site content, and providing better research, analysis, and decision-making tools to product and service managers for site and content development. Once interactions are identified, analyzed, classified, and tagged, the user interactions may be aggregated and mapped to activity charts, mind share tables, decision funnel diagrams, and the like. The interaction mapping may include mapping to the various stages of funnel diagrams, tables, and charts based upon additional behavior-based business rules. In this fashion, vendors may compare "documents" to their competitors at each stage of the marketing funnel.

Activities and interactions may be identified and tracked during the awareness stage of the marketing funnel and as a user progresses through the interest, engagement, consideration, and deep considerations stages, where ultimately a user may acquire the asset. In this fashion, the reporting tools of the present invention may be used to provide vendors with competitive snapshots in time with which to base future marketing decisions, including directing investment of future resources and evaluating performance of a particular campaign or asset. Performance issues may be identified and acted upon to continually evaluate a Web site provider or vendor portfolio. User trends may be identified as well as trends in media and content formats. Consumption may be profiled demographically to provide additional information with which to base future investments of resources.

As outlined above, the information gleaned from users and documents may be used to create a "user mart" that builds and stores user profiles to provide a 360-degree view of users. These profiles are compiled by mining user data from a variety of data sources and storing user profiles to tie domains together and to tract content consumption. The user mart may be evaluated, scored, and ranked to determine and track a value of a user. The value of the user may reflect the amount and type of information that the user has implicitly disclosed or explicitly disclosed. Users can then be ranked based upon their determined value.

In this fashion, the system and method of the present invention develops a deep understanding of users, their interests and passions, the topics they discuss and debate, the vendors they research and compare, the communities they form, the resources they look for to help with their daily jobs, their personal lives, and the like. The system and method of the present invention leverages this understanding to improve business processes relating to sales and marketing efforts, to improve user experiences with content and community relevancy, to provide dynamic site content, and to provide improved research, analysis, and decision-making tools to Web service providers and users.

Figure 10:
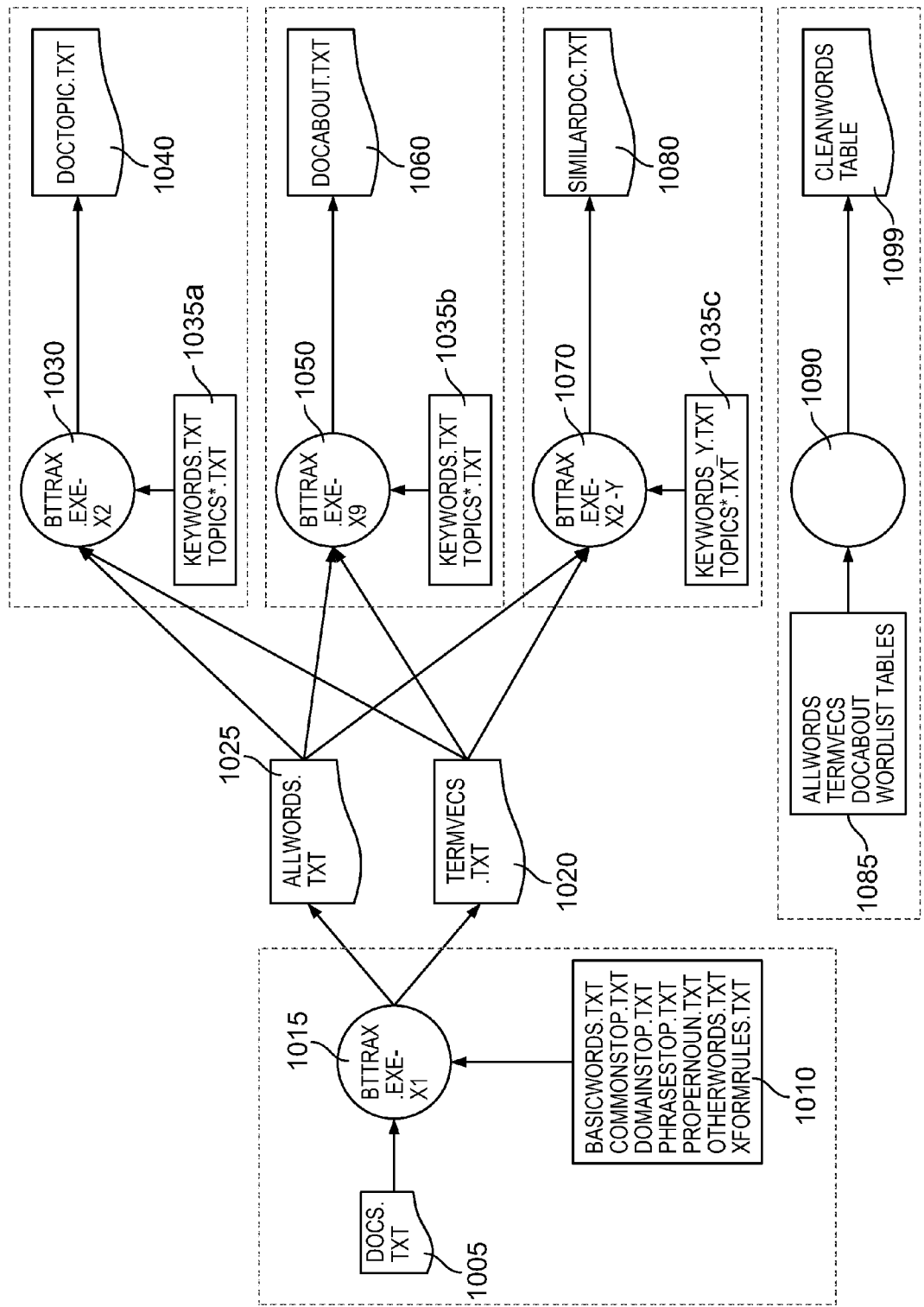
FIG. 10 is a work flow diagram illustrating a batch mode of operation of a system in accordance with the present invention.

In addition to manner in which the system and method of the present invention processes documents one at a time, the system and method of the present invention may also analyze, classify, and tag documents in an offline batch mode that processes the entire set of documents within the document database. This batch mode of processing may be performed nightly or during other periods of relatively low usage. The batch mode of processing may be performed off line as separate, discrete operations executed one after the other upon the entire set of documents as a whole, with the outputs of one step used as input for succeeding steps. FIG. 10 is a work flow diagram that shows a high-level workflow for the offline batch mode of operation of a system in accordance with the present invention.

A desirable goal of the text analysis process may be to minimize the dependence on a manually maintained dictionary in the term extraction step and increase the reliance and confidence in automated processes to identify valid terms.

Term filtration is the process of automatically reviewing all of the terms found for all documents in the document database, and using rules that are a combination of statistical attributes and heuristic techniques to identify "clean" terms. Some examples of these rules include a rule where a single-word noun is identified and selected using morphological rules (e.g. "goodness" from known adjective "good") that occur in lowercase form only. Additionally, single-word nouns that occur in lowercase form only in at least two documents, and that do not contain any digits or punctuation characters, and that either occur in a title or are flagged as a "standout" term in at least one document, may be selected as clean terms. Further, terms containing more than one word that occurs in both lowercase and non-lowercase forms in at least two documents may be selected as clean terms (for example, "Application server" and "application server"). Additionally, terms where another term with the same value but suffixed with "Corp.", "Inc.", "Ltd." and the like are selected as clean terms as long as the term without the suffix is an unknown term. The term filtration process is performed in batch mode only.

As shown in FIG. 10, in the batch mode of operation, the system and method of the present invention uses documents 1005 and uses the dictionary and pattern rules 1010 to extracts terms 1015 that include term vectors 1020 and a list and count of all terms 1025. The list and count of all terms 1025, as well as the term vectors may be classified 1030 using a list keywords and topics 1035*a* to produce a topic list 1040. Likewise, the list and count of all terms 1025 and the term vectors may be processed 1050 using the list of keywords and topics 1035*b* to produce a list of key words 1060. Additionally, the list and count of all terms 1025 and the term vectors may be processed 1070 using the list of keywords and topics 1035*c* to produce a document similarity measure 1080. Further, the terms 1085 found for all documents in the document database may be processed using rules that are a combination of statistical attributes and heuristic techniques 1090 to identify "clean" terms 1099.

The devices and subsystems of the exemplary embodiments of FIGS. 1-10 are for exemplary purposes, as many variations of the specific hardware used to implement the exemplary embodiments are possible, as will be appreciated by those skilled in the relevant arts. For example, the functionality of one or more of the devices and subsystems of the exemplary embodiments of FIGS. 1-10 can be implemented via one or more programmed computer systems or devices, including server computers, client computers, and the like.

To implement such variations as well as other variations, a single computer system can be programmed to perform the special purpose functions of one or more of the devices and subsystems of the exemplary embodiments of FIGS. 1-10. On the other hand, two or more programmed computer systems or devices can be substituted for any one of the devices and subsystems of the exemplary embodiments of FIGS. 1-10. Accordingly, principles and advantages of distributed processing, such as redundancy, replication, and the like, also can be implemented, as desired, to increase the robustness and performance of the devices and subsystems of the exemplary embodiments of FIGS. 1-10.

The devices and subsystems of the exemplary embodiments of FIGS. 1-10 can store information relating to various processes described herein. This information can be stored in one or more memories, such as a hard disk, optical disk, magneto-optical disk, RAM, and the like, of the devices and subsystems of the exemplary embodiments of FIGS. 1-10. One or more databases of the devices and subsystems of the exemplary embodiments of FIGS. 1-10 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-10 can include appropriate data structures for storing data collected and/or generated by the processes of the devices and subsystems of the exemplary embodiments of FIGS. 1-10 in one or more databases thereof.

All or a portion of the devices and subsystems of the exemplary embodiments of FIGS. 1-10 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments of FIGS. 1-10 can be implemented on the World Wide Web. In addition, the devices and subsystems of the exemplary embodiments of FIGS. 1-10 can be implemented by the preparation of application-specific integrated circuits or by interconnecting an appropriate network of conventional component circuits, as will be appreciated by those skilled in the electrical arts. Thus, the exemplary embodiments are not limited to any specific combination of hardware circuitry and/or software.

As stated above, the devices and subsystems of the exemplary embodiments of FIGS. 1-10 can include computer readable media or memories for holding instructions programmed according to the teachings of the present invention and for holding data structures, tables, records, and/or other data described herein. Computer readable media can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A computer-implemented method for building a user profile of a user, the method comprising:

labeling and storing user registration information in a database as a set of demographic nouns;

analyzing, with a computing device, author-generated classification information regarding at least one document of a set of documents and assigning a set of first taxonomic nouns to characterize the user based upon the author-generated classification information;

examining, with a computing device, a user-generated tag from a client computer and characterizing the user of at least one document of the set of documents and assigning a set of second taxonomic nouns to characterize the user based upon the user-generated tag characterization;

identifying, with a computing device, a method by which the user accessed at least one document of the set of documents from a content provider and assigning a set of third taxonomic nouns to characterize the user based upon the method of access;

evaluating, with a computing device, attributes that are related to the method of access and assigning a set of fourth taxonomic nouns to characterize the user based upon the attributes related to the method of access;

processing, with a computing device, at least one document of the set of documents to extract a set of fifth taxonomic nouns to characterize the user;

aggregating, with a computing device, the set of first taxonomic nouns, the set of second taxonomic nouns, the set of third taxonomic nouns, the set of fourth taxonomic nouns, and the set of fifth taxonomic nouns into a composite set of taxonomic nouns;

building, with a computing device, a user profile based upon the composite set of taxonomic nouns, the author-generated classification information, and at least one of the demographic nouns;

comparing, with a computing device, the composite set of taxonomic nouns with taxonomic nouns associated with a plurality of other user profiles corresponding to a plurality of other users; and modifying, with a computing device, the user profile based on the comparison.

2. The computer-implemented method for building a user profile of claim 1, wherein the user registration information characterizing the user of the document includes at least one of an item listed in a profile of the user and a technology implementation setting.

3. The computer-implemented method for building a user profile of claim 1, wherein the author-generated information includes metadata assigned to the document.

4. The computer-implemented method for building a user profile of claim 1, wherein the attributes related to the method of access include at least one of a network type used to access the document, a Web site from which the document was accessed, an electronic correspondence to which the document was associated, a time of day the document was accessed, a referrer who directed the user to the document, and a user category used by a database storing the document to describe the user.

5. The computer-implemented method for building a user profile of claim 1, wherein the attributes related to the method of access include at least one of a comment by the user, a rating by the user, a download by the user, and a purchase of a product or a service by the user indicating a level of a user's relative interest in the document in relation to other documents available to the user.

6. The computer-implemented method for building a user profile of claim 1, wherein building the user profile includes deriving a user cluster of related users.

7. The computer-implemented method for building a user profile of claim 1, further comprising assigning a value index to the user, wherein the value index is based on the user profile of the user and a user profile of at least one other user, and wherein the value index includes a weighting of at least one of the number of demographic nouns, the total number of taxonomic nouns, and the number of unique taxonomic nouns.

8. The computer-implemented method for building a user profile of claim 1, further comprising assigning a value index to the user, wherein the value index is based on the user profile of the user and a user profile of at least one other user, and wherein the value index assigned to the user dynamically changes based upon subsequent user activity.

9. The computer-implemented method for building a user profile of claim 1, wherein the attributes related to the method of access include at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

10. The computer-implemented method for building a user profile of claim 1, wherein a single computing device is configured to carry out the functions of two or more of the computing devices.

11. The computer-implemented method for building a user profile of claim 6, wherein building the user profile further includes:

computing a similarity measure between the user profile of the user of the electronic document and other user profiles of the cluster of related users; and building a group of related users based upon the user profile of the user of the electronic document and the user profiles of the cluster of related users.

12. The computer-implemented method for building a user profile of claim 7, wherein the value index is based on the weighting of the at least one of the number of demographic nouns, the total number of taxonomic nouns, and the number of unique taxonomic nouns for the user profile of the user and a weighting of at least one demographic noun or taxonomic noun for the user profile of the at least one other user.

13. The computer-implemented method for building a user profile of claim 8, wherein the subsequent user activity includes at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

14. The computer-implemented method for building a user profile of claim 12, further comprising:

collecting a number of user profiles to build a group of related users based upon the user profiles; and building an audience profile based upon the group of related users.

15. The computer-implemented method for building a user profile of claim 14, further comprising:

mining user data from at least one of a Web page, a uniform resource locator, a natural language document, a network address, an Internet Protocol address, and a database;

combining the mined user data with the collected user profiles; and creating a user mart of the combined mined user data and the collected user profiles to tie domains together and track user activity.

16. A computer-implemented method for building a user profile for a user, the method comprising:

labeling and storing, with a computing device, user registration information in a database as a set of demographic nouns;

determining, with a computing device, a composite set of taxonomic nouns, the composite set of taxonomic nouns representing the user profile based upon taxonomic nouns, the taxonomic nouns being prepared by one or more of the following steps:

analyzing, with a computing device, author-generated classification information regarding at least one document of a set of documents and assigning a set of first taxonomic nouns to characterize the user based upon the author-generated classification information;

examining, with a computing device, a user-generated tag from a client computer and characterizing the user of at least one document of the set of documents and assigning a set of second taxonomic nouns to characterize the user based upon the user-generated tag characterization;

identifying, with a computing device, a method by which the user accessed at least one document of the set of documents from a content provider and assigning a set of third taxonomic nouns to characterize the user based upon the search term;

evaluating, with a computing device, attributes that are related to the method of access and assigning a set of fourth taxonomic nouns to characterize the user based upon the attributes related to the method of access; and processing, with a computing device, at least one document of the set of documents to extract a set of fifth taxonomic nouns to characterize the user;

building, with a computing device, the user profile, the user profile based upon the composite set of taxonomic nouns, the author-generated classification information, and at least one of the demographic nouns;

comparing, with a computing device, the composite set of taxonomic nouns with taxonomic nouns associated with a plurality of other user profiles corresponding to a plurality of other users; and modifying, with a computing device, the user profile based on the comparison.

17. The computer-implemented method for building a user profile of claim 16, wherein the user registration information characterizing the user of the document includes at least one of an item listed in a profile of the user and a technology implementation setting.

18. The computer-implemented method for building a user profile of claim 16, wherein the author-generated information includes metadata assigned to the document.

19. The computer-implemented method for building a user profile of claim 16, wherein the attributes related to the method of access include at least one of a network type used to access the document, a Web site from which the document was accessed, an electronic correspondence to which the document was associated, a time of day the document was accessed, a referrer who directed the user to the document, and a user category used by a database storing the document to describe the user.

20. The computer-implemented method for building a user profile of claim 16, wherein the attributes related to the method of access include at least one of a comment by the user, a rating by the user, a download by the user, and a purchase of a product or a service by the user indicating a level of a user's relative interest in the document in relation to other documents available to the user.

21. The computer-implemented method for building a user profile of claim 16, wherein building the user profile includes deriving a user cluster of related users.

22. The computer-implemented method for building a user profile of claim 16, further comprising assigning a value index to the user, wherein the value index is based on the user profile of the user and a user profile of at least one other user, and wherein the value index includes a weighting of at least one of the number of demographic nouns, the total number of taxonomic nouns, and the number of unique taxonomic nouns.

23. The computer-implemented method for building a user profile of claim 16, further comprising assigning a value index to the user, wherein the value index is based on the user profile of the user and a user profile of at least one other user, and wherein the value index assigned to the user dynamically changes based upon subsequent user activity.

24. The computer-implemented method for building a user profile of claim 16, wherein the attributes related to the method of access include at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

25. The computer-implemented method for building a user profile of claim 16, wherein a single computing device is configured to carry out the functions of two or more of the computing devices.

26. The computer-implemented method for building a user profile of claim 21, wherein building the user profile further includes:
computing a similarity measure between the user profile of the user of the electronic document and other user profiles of the cluster of related users; and
building a group of related users based upon the user profile of the user of the electronic document and the user profiles of the cluster of related users.

27. The computer-implemented method for building a user profile of claim 22, wherein the value index is based on the weighting of the at least one of the number of demographic nouns, the total number of taxonomic nouns, and the number of unique taxonomic nouns for the user profile of the user and a weighting of at least one demographic noun or taxonomic noun for the user profile of the at least one other user.

28. The computer-implemented method for building a user profile of claim 22, further comprising:
collecting a number of user profiles to build a group of related users based upon the user profiles; and
building an audience profile based upon the group of related users.

29. The computer-implemented method for building a user profile of claim 23, wherein the subsequent user activity includes at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

30. The computer-implemented method for building a user profile of claim 28, further comprising:
mining user data from at least one of a Web page, a uniform resource locator, a natural language document, a network address, an Internet Protocol address, and a database;
combining the mined user data with the collected user profiles; and
creating a user mart of the combined mined user data and the collected user profiles to tie domains together and track user activity.

31. A computer program product with instructions recorded on a non-transitory computer readable storage medium, which, when executed by a processor, carry out a method for building a user profile for a user, the instructions comprising:
instructions for labeling and storing, with a computing device, user registration information in a database as a set of demographic nouns;
instructions for analyzing, with a computing device, author-generated classification information regarding at least one document of a set of documents and assigning a set of first taxonomic nouns to characterize the user based upon the author-generated classification information;
instructions for examining, with a computing device, a user-generated tag from a client computer and characterizing the user of at least one document of the set of documents and assigning a set of second taxonomic nouns to characterize the user based upon the user-generated tag characterization;
instructions for identifying, with a computing device, a method by which the user accessed at least one document of the set of documents from a content provider and assigning at set of third taxonomic nouns to characterize the user based upon the method of access;

instructions for evaluating, with a computing device, attributes that are related to the method of access and assigning a set of fourth taxonomic nouns to characterize the user based upon the attributes related to the method of access;

instructions for processing, with a computing device, at least one document of the set of documents to extract a set of fifth taxonomic nouns to characterize the user;

instructions for aggregating, with a computing device, the set of first taxonomic nouns, the set of second taxonomic nouns, the set of third taxonomic nouns, the set of fourth taxonomic nouns, and the set of fifth taxonomic nouns into a composite set of taxonomic nouns;

instructions for building, with a computing device, a user profile based upon the composite set of taxonomic nouns, the author-generated classification information, and at least one of the demographic nouns;

instructions for comparing, with a computing device, the composite set of taxonomic nouns with taxonomic nouns associated with a plurality of other user profiles corresponding to a plurality of other users; and instructions for modifying, with a computing device, the user profile based on the comparison.

32. The computer program product for building a user profile of claim 31, wherein the user registration information characterizing the user of the document includes at least one of an item listed in a profile of the user and a technology implementation setting.

33. The computer program product for building a user profile of claim 31, wherein the author-generated information includes metadata assigned to the document.

34. The computer program product for building a user profile of claim 31, wherein the attributes related to the method of access include at least one of a network type used to access the document, a Web site from which the document was accessed, an electronic correspondence to which the document was associated, a time of day the document was accessed, a referrer who directed the user to the document, and a user category used by a database storing the document to describe the user.

35. The computer program product for building a user profile of claim 31, wherein the attributes related to the method of access include at least one of a comment by the user, a rating by the user, a download by the user, and a purchase of a product or a service by the user indicating a level of a user's relative interest in the document in relation to other documents available to the user.

36. The computer program product for building a user profile of claim 31, wherein building the user profile includes deriving a user cluster of related users.

37. The computer program product for building a user profile of claim 31, further comprising instructions for assigning, with a computing device, a value index to the user, wherein the value index is based on the user profile of the user and a user profile of at least one other user, and wherein the value index includes a weighting of at least one of the number of demographic nouns, the total number of taxonomic nouns, and the number of unique taxonomic nouns.

38. The computer program product for building a user profile of claim 31, further comprising instructions for assigning, with a computing device, a value index to the user, wherein the value index is based on the user profile of the user and a user profile of at least one other user, and wherein the value index assigned to the user dynamically changes based upon subsequent user activity.

39. The computer program product for building a user profile of claim 31, wherein the attributes related to the method of access include at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

40. The computer program product for building a user profile of claim 31, wherein a single computing device is configured to carry out the functions of two or more of the computing devices.

41. The computer program product for building a user profile of claim 36, wherein building the user profile further includes:

computing a similarity measure between the user profile of the user of the electronic document and other user profiles of the cluster of related users; and building a group of related users based upon the user profile of the user of the electronic document and the user profiles of the cluster of related users.

42. The computer program product for building a user profile of claim 37, wherein the value index is based on the weighting of the at least one of the number of demographic nouns, the total number of taxonomic nouns, and the number of unique taxonomic nouns for the user profile of the user and a weighting of at least one demographic noun or taxonomic noun for the user profile of the at least one other user.

43. The computer program product for building a user profile of claim 37, further comprising:

instructions for collecting a number of user profiles to build a group of related users based upon the user profiles; and instructions for building an audience profile based upon the group of related users.

44. The computer program product for building a user profile of claim 38, wherein the subsequent user activity includes at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

45. The computer program product for building a user profile of claim 43, further comprising:

instructions for mining user data from at least one of a Web page, a uniform resource locator, a natural language document, a network address, an Internet Protocol address, and a database;

instructions for combining the mined user data with the collected user profiles; and instructions for creating a user mart of the combined mined user data and the collected user profiles to tie domains together and track user activity.

46. A system for building a user profile for a user, the system comprising:

a computing device configured to label and store user registration information in a database as a set of demographic nouns;

a computing device configured to analyze author-generated classification information regarding a user of at least one document of a set of documents and assign a set of first taxonomic nouns to characterize the user based upon the author-generated classification information;

a computing device configured to examine a user-generated tag from a client computer characterizing the user of at least one document of the set of documents and assign a set of second taxonomic nouns to characterize the user based upon the user-generated tag characterization;

a computing device configured to identify a method by which the user accessed at least one document of the set of documents from a content provider and assign a set of third taxonomic nouns to characterize the user based upon the method of access;

a computing device configured to evaluate attributes related to the method of access and assign a set of fourth taxonomic nouns to characterize the user based upon the attributes related to the method of access; a computing device configured to process at least one document of the set of documents to extract a set of fifth taxonomic nouns to characterize the user;

a computing device configured to aggregate the set of first taxonomic nouns, the set of second taxonomic nouns, the set of third taxonomic nouns, the set of fourth taxonomic nouns, and the set of fifth taxonomic nouns into a composite set of taxonomic nouns that represent the user;

a computing device configured to build a user profile based upon the composite set of taxonomic nouns, the author-generated classification scheme, and at least one of the demographic nouns;

a computing device configured to compare the composite set of taxonomic nouns with taxonomic nouns associated with a plurality of other user profiles corresponding to a plurality of other users; and a computing device configured to modify the user profile based on the comparison.

47. The system for building a user profile of claim 46, wherein the user registration information characterizing the user of the document includes at least one of an item listed in a profile of the user and a technology implementation setting.

48. The system for building a user profile of claim 46, wherein the author-generated information includes metadata assigned to the document.

49. The system for building a user profile of claim 46, wherein the attributes related to the method of access include at least one of a network type used to access the document, a Web site from which the document was accessed, an electronic correspondence to which the document was associated, a time of day the document was accessed, a referrer who directed the user to the document, and a user category used by a database storing the document to describe the user.

50. The system for building a user profile of claim 46, wherein the attributes related to the method of access include at least one of a comment by the user, a rating by the user, a download by the user, and a purchase of a product or a service by the user indicating a level of a user's relative interest in the document in relation to other documents available to the user.

51. The system for building a user profile of claim 46, wherein building the user profile includes deriving a user cluster of related users.

52. The system for building a user profile of claim 46, further comprising a computing device configured to assign a value index to the user, wherein the value index is based on the user profile of the user and a user profile of at least one other user, and wherein the value index includes a weighting of at least one of the number of demographic nouns, the total number of taxonomic nouns, and the number of unique taxonomic nouns.

53. The system for building a user profile of claim 46, further comprising a computing device configured to assign a value index to the user, wherein the value index is based on the user profile of the user and a user profile of at least one other user, and wherein the value index assigned to the user dynamically changes based upon subsequent user activity.

54. The system for building a user profile of claim 46, wherein the attributes related to the method of access include at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

55. The system for building a user profile of claim 46, wherein a single computing device is configured to carry out the functions of two or more of the computing devices.

56. The system for building a user profile of claim 51, wherein building the user profile further includes:
    computing a similarity measure between the user profile of the user of the electronic document and other user profiles of the cluster of related users; and
    building a group of related users based upon the user profile of the user of the electronic document and the user profiles of the cluster of related users.

57. The system for building a user profile of claim 52, wherein the value index is based on the weighting of the at least one of the number of demographic nouns, the total number of taxonomic nouns, and the number of unique taxonomic nouns for the user profile of the user and a weighting of at least one demographic noun or taxonomic noun for the user profile of the at least one other user.

58. The system for building a user profile of claim 52, further comprising:
    a computing device configured to collect a number of user profiles to build a group of related users based upon the user profiles; and
    a computing device configured to build an audience profile based upon the group of related users.

59. The system for building a user profile of claim 53, wherein the subsequent user activity includes at least one of sharing the user's interests, clicking on a newsletter, participating in a discussion, reading or writing a blog, downloading a white paper, purchasing a product or a service, reviewing a product or service, sharing a document, posting to a social network, sending an email, and disclosing information about the user.

60. The system for building a user profile of claim 58, further comprising:
    a computing device configured to mine user data from at least one of a Web page, a uniform resource locator, a natural language document, a network address, an Internet Protocol address, and a database;
    a computing device configured to combine the mined user data with the collected user profiles; and
    a computing device configured to create a user mart of the combined mined user data and the collected user profiles to tie domains together and track user activity.

* * * * *